United States Patent
Sugawara

(10) Patent No.: US 9,835,872 B2
(45) Date of Patent: *Dec. 5, 2017

(54) LENS HOLDER DRIVING DEVICE

(71) Applicant: Masayoshi Sugawara, Tokyo (JP)

(72) Inventor: Masayoshi Sugawara, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/292,267

(22) Filed: Oct. 13, 2016

(65) Prior Publication Data

US 2017/0031174 A1  Feb. 2, 2017

Related U.S. Application Data

(63) Continuation of application No. 14/690,504, filed on Apr. 20, 2015, now Pat. No. 9,500,878, which is a (Continued)

(30) Foreign Application Priority Data

Jul. 15, 2011  (JP) ................................. 2011-157035

(51) Int. Cl.
*G02B 27/64*  (2006.01)
*G02B 7/08*  (2006.01)
(Continued)

(52) U.S. Cl.
CPC ............. *G02B 27/646* (2013.01); *G02B 7/08* (2013.01); *G02B 7/09* (2013.01); *G03B 3/10* (2013.01);
(Continued)

(58) Field of Classification Search
None
See application file for complete search history.

(56) References Cited

U.S. PATENT DOCUMENTS 7,619,838 B2  11/2009  Takahashi
7,650,065 B2  1/2010  Takahashi
(Continued)

FOREIGN PATENT DOCUMENTS

JP  H11-64905 A  3/1999
JP  2002-274242 A  9/2002
(Continued)

*Primary Examiner* — Derek S Chapel
(74) *Attorney, Agent, or Firm* — Brundidge & Stanger, P.C.

(57) ABSTRACT

An AF unit of a lens holder driving device includes a lens holder, a focusing coil, a permanent magnet having a plurality of permanent magnet pieces having first surfaces opposed to the focusing coil, a magnet holder holding the permanent magnet, and first and second leaf springs supporting the lens holder in a direction of an optical axis shiftably. An image stabilizer portion includes a fixed portion disposed near the second leaf spring, a supporting member swingably supporting the AF unit with respect to the fixed portion, an image stabilizer coil having a plurality of image stabilizer coil portions disposed so as to oppose to second surfaces of the plurality of permanent magnet pieces that are perpendicular to the first surfaces, and a plurality of Hall elements. Each Hall element is disposed at a position where the image stabilizer coil portion is separated into a plurality of coil parts.

4 Claims, 22 Drawing Sheets

Related U.S. Application Data continuation of application No. 13/548,730, filed on Jul. 13, 2012, now Pat. No. 9,036,260.

(51) Int. Cl.

| | | |
|---|---|---|
| *G03B 3/10* | (2006.01) | |
| *G03B 5/00* | (2006.01) | |
| *H04N 5/225* | (2006.01) | |
| *H04N 5/232* | (2006.01) | |
| *G02B 7/09* | (2006.01) | |
| *G03B 13/36* | (2006.01) | |

(52) U.S. Cl.
CPC .............. *G03B 5/00* (2013.01); *G03B 13/36* (2013.01); *H04N 5/2254* (2013.01); *H04N 5/2328* (2013.01); *H04N 5/23258* (2013.01); *H04N 5/23287* (2013.01); *G03B 2205/0015* (2013.01); *G03B 2205/0069* (2013.01)

(56) References Cited

U.S. PATENT DOCUMENTS

| | | | |
|---|---|---|---|
| 7,881,598 B1 | 2/2011 | Wu et al. | |
| 9,013,588 B2 | 4/2015 | Moriya et al. | |
| 9,036,260 B2 | 5/2015 | Sugawara | |
| 9,042,042 B2 | 5/2015 | Wade et al. | |
| 9,405,088 B2* | 8/2016 | Hayashi | G02B 7/08 |
| 9,465,231 B2* | 10/2016 | Hu | G02B 7/08 |
| 9,500,878 B2* | 11/2016 | Sugawara | G02B 7/08 |
| 9,568,743 B2* | 2/2017 | Hayashi | G02B 27/646 |
| 2007/0009244 A1 | 1/2007 | Takahashi | |
| 2007/0035860 A1 | 2/2007 | Adachi et al. | |
| 2010/0135648 A1 | 6/2010 | Enomoto | |
| 2011/0097062 A1 | 4/2011 | Tsuruta et al. | |
| 2011/0176046 A1 | 7/2011 | Hu et al. | |
| 2011/0217029 A1 | 9/2011 | Wu et al. | |
| 2012/0154614 A1 | 6/2012 | Moriya et al. | |
| 2012/0314307 A1 | 12/2012 | Ikushima et al. | |
| 2013/0050828 A1 | 2/2013 | Sato et al. | |
| 2013/0215511 A1 | 8/2013 | Wu et al. | |
| 2016/0025995 A1 | 1/2016 | Ariji | |
| 2016/0178923 A1* | 6/2016 | Hayashi | G02B 7/04 359/557 |
| 2016/0306134 A1* | 10/2016 | Hayashi | G02B 7/08 |

FOREIGN PATENT DOCUMENTS

| | | |
|---|---|---|
| JP | 2006-065352 A | 3/2006 |
| JP | 2006-215095 A | 8/2006 |
| JP | 2007-017874 A | 1/2007 |
| JP | 2007-017957 A | 1/2007 |
| JP | 2007-025616 A | 2/2007 |
| JP | 2007-041455 A | 2/2007 |
| JP | 2007-093953 A | 4/2007 |
| JP | 2007-212876 A | 8/2007 |
| JP | 2008-015159 A | 1/2008 |
| JP | 2008-026634 A | 2/2008 |
| JP | 2009-109583 A | 5/2009 |
| JP | 2009-145771 A | 7/2009 |
| JP | 2009-288770 A | 12/2009 |
| JP | 2010-112978 A | 5/2010 |
| JP | 2011-065140 A | 3/2011 |
| JP | 2011-085666 A | 4/2011 |
| JP | 2011-107470 A | 6/2011 |
| JP | 2011-113009 A | 6/2011 |
| JP | 2011-117336 A | 6/2011 |
| JP | 2011-128583 A | 6/2011 |
| WO | 2011-021559 A1 | 2/2011 |
| WO | 2011-062123 A1 | 5/2011 |

* cited by examiner

|  | BAND NOT HIGHER THAN PRIMARY RESONANCE FREQUENCY $|a|>|b|$ | BAND NOT LOWER THAN PRIMARY RESONANCE FREQUENCY $|a|>|b|$ | BAND NOT LOWER THAN PRIMARY RESONANCE FREQUENCY $|a|<|b|$ |
|---|---|---|---|
| MAGNETIC FLUX DENSITY GIVEN BY MAGNET: a | 0deg | -180deg | -180deg |
| MAGNETIC FLUX DENSITY GENERATED IN COIL: b | 0deg | 0deg | 0deg |
| TOTAL MAGNETIC FLUX DENSITY: a+b | 0deg | -180deg | 0deg |

FIG. 10
RELATED ART

|  | BAND NOT HIGHER THAN PRIMARY RESONANCE FREQUENCY $\|a\| > \|b\|$ | BAND NOT LOWER THAN PRIMARY RESONANCE FREQUENCY $\|a\| > \|b\|$ | BAND NOT LOWER THAN PRIMARY RESONANCE FREQUENCY $\|a\| < \|b\|$ |
|---|---|---|---|
| MAGNETIC FLUX DENSITY GIVEN BY MAGNET: a | 0deg | -180deg | -180deg |
| MAGNETIC FLUX DENSITY GENERATED IN COIL: b | -180deg | -180deg | -180deg |
| TOTAL MAGNETIC FLUX DENSITY: a+b | 0deg | -180deg | -180deg |

FIG. 17

LENS HOLDER DRIVING DEVICE

CROSS-REFERENCE TO THE RELATED APPLICATION

The present application is a Continuation application of application Ser. No. 14/690,504, filed Apr. 20, 2015, which is a Continuation application of application Ser. No. 13/548,730, filed Jul. 13, 2012, now U.S. Pat. No. 9,036,260; which claims the benefit of priority from Japanese Patent Application No. 2011-157035, filed on Jul. 15, 2011, the disclosure of which is incorporated herein in its entirety by reference.

BACKGROUND OF THE INVENTION

This invention relates to a lens holder driving device and, in particular, to a lens holder driving device capable of picking up a static image without blurry images by stabilizing the blurry images (movement) occurring upon shooting the static image using a miniature camera for a mobile terminal.

Hitherto, various lens holder driving devices has been proposed which are capable of taking photographs with a high degree by stabilizing blurry images on an image-forming surface although there are blurry images (movement) upon shooting the static image.

As image stabilizing methods, "optical methods" such as a sensor shift method or a lens shift method and "a software stabilizing method" for stabilizing the blurry images using image processing by software are known. An image stabilizing method introduced in the mobile terminal mainly adopts the software stabilizing method.

The software stabilizing method is disclosed, for example, in Japanese Unexamined Patent Application Publication No. H11-64905 (JP-A-H11-064905) (which will be also called Patent Document 1). The software stabilizing method disclosed in Patent Document 1 comprises the steps of removing noise components from detected results of detection means, of calculating, from a detected signal in which the noise components are removed, particular information necessary to stabilize image blurred due to an image blurring of an image pickup device, thereby making a picked-up image be at a standstill in a nonshaking state where the image pickup device remains at rest.

However, the image stabilizing method of "the software stabilizing method" disclosed in the Patent Document 1 has a problem so that image quality degrades in compassion with the "optical method" which will later be described. In addition, the image stabilizing method of the software stabilizing method has disadvantage so that a taking time interval becomes longer because processing of the software is included therein.

Therefore, as the image stabilizing methods, request of "the optical methods" are on the increase with higher pixels in recent years. As the image stabilizing methods of "the optical methods", "a sensor shift method", "a lens shift method", and "an optical unit tilt method" are known.

The sensor shift method is disclosed, for example, in Japanese Unexamined Patent Application Publication No. 2002-274242 (JP-A-2002-274242) (which will be also called Patent Document 2). A digital camera disclosed in Patent Document 2 has structure in which an image pickup device (CCD) can shift with a center at a reference position (center) by an actuator. The CDD is disposed in a CCD moving portion. The CCD can move in a X-Y plane orthogonal to a Z-axis by the CCD moving portion. The CCD moving portion mainly comprises three members: a base plate fixed to a housing; a first slider moving with respect to the base plate in a direction of an X-axis; and a second slider moving with respect to the first slider in a direction of a Y-axis.

However, in "the sensor shift method" as disclosed in Patent Document 2, the CCD moving portion (a movable mechanism) becomes large. It is therefore difficult in terms of size (outer dimensions, a height) to adopt the image stabilizer of the sensor shift method to a miniature camera for a mobile phone.

Now, the description will proceed to the lens shift method.

By way of illustration, Japanese Unexamined Patent Application Publication No. 2009-145771 (JP-A-2009-145771) (which will be also called Patent Document 3) discloses an image stabilizing device including an image stabilizing unit for driving a correction lens. The image stabilizing unit comprises a base plate serving as a fixed member, a movable mirror barrel holding the correction lens movably, three balls sandwiched between the base plate and the movable mirror barrel, and a plurality of elastic bodies for elastically supporting the movable mirror barrel with respect to the base plate, two coils fixed to the base plate, and two magnets fixed to the movable mirror barrel.

In addition, Japanese Unexamined Patent Application Publication No. 2006-65352 (JP-A-2006-065352) (which will be also called Patent Document 4) discloses "an image stabilizing device" for stabilizing image blurred by moving and controlling a particular lens group (which will later be called "a correction lens") among an image pickup optical system comprising a plurality of lens groups in two directions orthogonally crossing to each other within a plane perpendicular to an optical axis. In the image stabilizing device disclosed in Patent Document 4, the correction lens is movably supported with respect to a fixed frame up and down (in a pitch direction) and from side to side (in a yaw direction) via a pitching moving box and a yawing moving frame.

Japanese Unexamined Patent Application Publication No. 2008-26634 (JP-A-2008-026634) (which will be also called Patent Document 5) discloses "an image stabilizing unit" including a stabilizing optical member for stabilizing blurry images formed by an imaging optical system by being moved to a direction crossed with an optical axis of the imaging optical system. In the stabilizing optical member disclosed in Patent Document 5, a lens holding flame for holding a correction lens is movably supported with respect to a receiving barrel in a pitch direction and a yaw direction via a pitch slider and a yaw slider.

Japanese Unexamined Patent Application Publication No. 2006-215095 (JP-A-2006-215095) (which will be also called Patent Document 6) discloses "an image stabilizing device" which is capable of moving a correction lens by small driving force and which is capable of rapidly and accurately stabilizing the blurry images. The image stabilizing device disclosed in Patent Document 5 comprises a holding frame holding the correction lens, a first slider for slidably supporting the holding frame in a first direction (a pitch direction), a second slider for slidably supporting the holding frame in a second direction (a yaw direction), a first coil motor for driving the first slider in the first direction, and a second coil motor for driving the second slider in the second direction.

Japanese Unexamined Patent Application Publication No. 2008-15159 (JP-A-2008-015159) (which will be also called Patent Document 7) discloses a lens barrel comprising an image stabilizing optical system provided to enable to move in a direction orthogonal to an optical axis. In the image stabilizing optical system disclosed in Patent Document 7, a movable VR unit disposed in a VR body unit holds a correction lens (a third lens group) and is disposed so as to enable to move in a X-Y plane orthogonal to the optical axis.

Japanese Unexamined Patent Application Publication No. 2007-212876 (JP-A-2007-212876) (which will be also called Patent Document 8 and which corresponds to U.S. Pat. No. 7,619,838) discloses "an image stabilizer" which is capable to stabilize image blurred by performing control so that the optical axis of a correction lens held in a moving frame may be aligned with the optical axis of a lens system by moving the correction lens in first and second directions orthogonal to the optical axis of the lens system by driving means.

Japanese Unexamined Patent Application Publication No. 2007-17957 (JP-A-2007-017957) (which will be also called Patent Document 9) discloses "an image stabilizer" for stabilizing image blurred by driving a correcting lens for stabilizing the blurry images that are formed by a lens system by operation of a lens driving part in a first direction and a second direction which are perpendicular to an optical axis of the lens system and which are perpendicular to each other. In the image stabilizer disclosed in Patent Document 9, the lens driving part is provided at one side of the correcting lens in the direction perpendicular to the optical axis.

Japanese Unexamined Patent Application Publication No. 2007-17874 (JP-A-2007-017874) (which will be also called Patent Document 10 and which corresponds to U.S. Pat. No. 7,650,065) discloses "an image stabilizer" which is capable to stabilize blurry images by performing control so that the optical axis of a correction lens held in a moving frame may be aligned with the optical axis of a lens system by moving the correction lens in first and second directions which are perpendicular to the optical axis of the lens system and which are perpendicular to each other. The image stabilizer disclosed in Patent Document 10 comprises driving means including a coil and a magnet which can be relatively moved. One of the coil and the magnet is fixed to a moving frame while another is fixed to a supporting frame for supporting a movable frame movably. In addition, the image stabilizer disclosed in Patent Document 10 comprises a first Hall element for detecting position information related to the first direction of the correction lens by detecting a magnetic force of the magnet and a second Hall element for detecting position information related to the second direction of the correction lens by detecting the magnetic force of the magnet.

Any of the image stabilizers (the image stabilizing devices) of "the lens shift method" disclosed in the above-mentioned Patent Documents 3 to 10 has structure for moving and adjusting the correction lens in a plane perpendicular to the optical axis. However, such image stabilizers (the image stabilizing devices) have problems in which structure is complicated and they are unsuited for miniaturization. That is, like in the above-mentioned image stabilizer of the sensor shift method, it is difficult in terms of size (outer dimensions, a height) to adopt the image stabilizer of the lens shift method to the miniature camera for the mobile phone.

In order to resolve the above-mentioned problems, an image stabilizer (an image stabilizing device) has been proposed which stabilizes blurry images (image blurred) by swinging a lens module (a camera module) for holding a lens and a pickup device (an image sensor) in itself. Such a method will be referred to herein as "an optical unit tilting method".

Now, the description will proceed to "the optical unit tilting method".

By way of illustration, Japanese Unexamined Patent Application Publication No. 2007-41455 (JP-A-2007-041455) (which will be also called Patent Document 11) discloses "an image stabilizer of an optical device" comprising a lens module for holding a lens and an imaging element, a frame structure for rotatably supporting the lens module by rotary shafts, driving means (actuators) for rotating the lens module with respect to the frame structure by imparting driving force to driven parts (rotors) of the rotary shafts, and energizing means (leaf springs) for energizing the driving means (the actuators) to the driven parts (the rotors) of the rotary shafts. The frame structure comprises an inner frame and an outer frame. The driving means (the actuators) is disposed so as to be in contact with the driven parts (the rotors) of the rotary shafts from directions perpendicular to an optical axis. The driving means (the actuators) comprises a piezoelectric element and an action part of the rotary shafts side. The action part drives the rotary shafts by vertical vibrations and bending vibrations of the piezoelectric element.

However, it is necessary for the image stabilizer of "the optical unit tilting method" disclosed in Patent Document 11 to cover the lens module with the frame structure comprising the inner frame and the outer frame. As a result, there is a problem in which the image stabilizer becomes large.

In addition, Japanese Unexamined Patent Application Publication No. 2007-93953 (JP-A-2007-093953) (which will be also called Patent Document 12) discloses "an image stabilizer for a camera" for stabilizing blurry images upon shooting a static image by accommodating a camera module in which a pickup lens and an image sensor are integrated in a housing, by swingably mounting the camera module in housing at a center of first and second axes which are orthogonal to a pickup optical axis and which cross each other at right angles, and by controlling the attitude of the camera module as a whole in the housing in response to a shake of the housing detected by a shake sensor. The image stabilizer for the camera disclosed in Patent Document 12 comprises an intermediate frame for swingably supporting an inner frame in which the camera module is fixed at the first axis as a center from the outside thereof, an outer frame, fixed to the housing, for swingably supporting the intermediate frame at the second axis as a center from the outside thereof, first driving means, mounted inside the intermediate frame, for swinging the inner frame around the first axis in response to a shake signal from a shake sensor (a first sensor module for detecting a shake in a pitch direction), and second driving means, mounted inside the outer frame, for swinging the intermediate frame around the second axis in response to a shake signal from a shake sensor (a second sensor module for detecting a shake in a yaw direction). The first driving means comprises a first stepping motor, a first reduction gear train for reducing a rotation thereof, and a first cam for swinging the inner frame through a first cam follower provided to the inner frame by rotating it integral with a final stage gear. The second driving means comprises a second stepping motor, a second reduction gear train for reducing a rotation thereof, and a second cam for swinging the intermediate frame through a second cam follower provided to the intermediate frame by rotating it integral with a final stage gear.

However, also in the image stabilizer of "the optical unit tilting method" disclosed in Patent Document 12, it is necessary to cover the camera module with the inner frame, the intermediate frame, and the outer frame. As a result, the image stabilizer becomes large. Furthermore, inasmuch as there are the rotary axes in "the optical unit tilting method", there is a problem in which friction is produced between a hole and an axis and it results in exhibiting hysteresis.

Furthermore, Japanese Unexamined Patent Application Publication No. 2009-288770 (JP-A-2009-288770) (which will be also called Patent Document 13 and which corresponds to US 2011/097062) discloses an optical photography device which is capable of reliably stabilizing blurry images by improving the structure of an photography unit drive mechanism for stabilizing the blurry images in an photography unit. The optical photography device disclosed in Patent Document 13 comprises, inside a fixed cover, the photography unit (a movable module) and an image stabilizing mechanism for stabilizing blurry images by displacing the photography unit. The photography unit is for moving a lens along a direction of an optical axis. The photography unit comprises a moving body for holding the lens and a fixed aperture therein, a lens driving mechanism for moving the moving body in the direction of the optical axis, and a supporting body in which the lens driving mechanism and the moving body are mounted. The lens driving mechanism comprises a lens driving coil, a lens driving magnet, and a yoke. The photography unit is supported to a fixed body via four suspension wires. At two positions on both sides sandwiching the optical axis, a first photography unit drive mechanism and a second photography unit drive mechanism, which are for stabilizing the blurry images, are respectively provided as a pair. In each of their photography unit drive mechanisms, a photography unit drive magnet is held in a movable body side while a photography unit drive coil is held in a fixe body side.

However, in the optical photography device of "the optical unit tilting method" disclosed in Patent Document 13, it is necessary to use the photography unit drive magnets as well as the lens drive magnet. As a result, there is a problem in which the optical photography device becomes large.

In addition, Japanese Unexamined Patent Application Publication No. 2011-107470 (JP-A-2011-107470) (which will be also called Patent Document 14) discloses a lens driving device which is capable of not only driving a lens in a direction of an optical axis but also stabilizing blurry images. The lens driving device disclosed in Patent Document 14 comprises a first holding body for holding the lens so as to be movable it in the direction of the optical axis (Z direction), a second holding body for holding the first holding body so as to be movable it in the Z direction, a fixed body for holding the second holding body so as to be movable it in a direction which is substantially orthogonal to the Z direction, a first driving mechanism for driving the first holding body in the Z direction, a second driving mechanism for driving the second holding body in an X direction, and a third driving mechanism for driving the second holding body in a Y direction. The first holding body is supported to the second holding body by a first supporting member made of an elastic material so as to be movable in the Z direction. The second holding body is supported to the fixed body by a second supporting member made of an elastic material so as to be movable in the Z direction. The first driving mechanism comprises a first drive coil and a first drive magnet, the second driving mechanism comprises a second drive coil and a second drive magnet, and the third driving mechanism comprises a third drive coil and a third drive magnet.

In the lens driving device disclosed in Patent Document 14, three kinds of driving mechanisms consisting of the first through the third driving mechanism require as driving mechanisms, and each of the first through third driving mechanisms comprises a coil and a magnet, independently. Therefore, there is a problem in which the number of parts is increased.

Japanese Unexamined Patent Application Publication No. 2011-113009 (JP-A-2011-113009) (which will be also called Patent Document 15) discloses a lens driving device which uses a plurality of wires as the second supporting member and which comprises a buckling prevention member for preventing buckling of the wires while its basic structure is similar to the lens driving mechanism disclosed in the above-mentioned Patent Document 14. Each wire is formed in a straight line and the second holding member is supported by the wires so as to be movable in the direction which is substantially orthogonal to the Z direction. The buckling prevention member is made of an elastic member and becomes elastically deformed in the Z direction at a force smaller than a buckling load of the wire. More specifically, the buckling prevention member comprises a wire fixed portion formed to a leaf spring for the first supporting member. When a force applies to a movable part such as the second holding body downwards, the wire fixed portion becomes elastically deformed downwards.

In also the lens driving device disclosed in Patent Document 15, in the manner similar to the lens driving device disclosed in Patent Document 14, there is a problem in which the number of parts is increased. In addition, the lens driving device disclosed in Patent Document 15 merely prevents the wires from buckling because the force applies to the wires in a direction to compress. In other words, the lens driving device disclosed in Patent Document 15 does not take into account in a case where the wires may rupture because a force applies to the wires in a direction to extend.

Therefore, the present inventor and another proposed an image stabilizer which is capable of miniaturizing and lowering a height by sharing a permanent magnet for an auto-focusing (AF) lens driving device as a permanent magnet for the image stabilizer (see, Japanese Unexamined Patent Application Publication No. 2011-65140 (JP-A-2011-065140) (which will be also called Patent Document 16)).

The image stabilizer disclosed in Patent Document 16 is called an image stabilizer of "a barrel shift method" because camera shake is corrected by moving a lens barrel received in an AF lens driving device in itself. In addition, the image stabilizers of "the barrel shift method" are classified into "a moving magnet method" in which the permanent magnet moves (is movable) and "a moving coil method" in which the coil moves (is movable).

Patent Document 16 discloses, as the image stabilizer of "the moving magnet method" in a second exemplary embodiment thereof", an image stabilizer which is provided with a permanent magnet comprising four first permanent magnet pieces and four second permanent magnet pieces which are disposed so as to apart from up and down in a direction of an optical axis and which is provided with a stabilizer coil disposed between the upper four first permanent magnet pieces and the lower four second permanent magnet pieces. That is, the second exemplary embodiment comprises the image stabilizer of "the moving magnet method" including the permanent magnet comprising eight permanent magnet pieces in total.

In the image stabilizer disclosed in Patent Document 16, a base is disposed so as to apart from at a bottom portion of the auto-focusing lens driving device and a plurality of suspension wires have one ends which are fixed to the base at outer regions thereof. The plurality of suspension wires has other ends which are firmly fixed to the auto-focusing lens driving device.

In the image stabilizer disclosed in Patent Document 16, there is a problem in which the number of parts is increased because the permanent magnet comprises the eight permanent magnet pieces. In addition, there is another problem in which it expends in time on assembling because the image stabilizer coil is disposed between the upper four first permanent magnet pieces and the lower four second permanent magnet pieces.

Japanese Unexamined Patent Application Publication No. 2011-85666 (JP-A-2011-085666) (which will be also called Patent Document 17) also discloses a lens driving device which shares an AF control magnet as an image stabilizer control magnet. The lens driving device disclosed in Patent Document 17 comprises a lens holder including a first coil (an AF coil) disposed at an outer periphery of a lens, a magnet holder configured to fix a magnet having a first surface facing the first coil, springs for supporting the lens holder so as to couple the lens holder with the magnet holder and also so that the lens holder is moved with respect to the magnet in a direction of an optical axis, and a base member configured so that a second coil (an image stabilizer coil) is fixed to face a second surface of the magnet that is perpendicular to the first surface thereof. A lens holding unit, which comprises the lens holder, the magnet, the magnet holder, and the springs, is held so as to be relatively movable in a direction perpendicular to the optical axis relative to the base member.

Patent Document 17 discloses the lens driving device as a six exemplary embodiment in which a position detection sensor is disposed at a clearance of the image stabilizer coil wound. A Hall element is used as the position detection sensor. In addition, the lens holding unit is held by suspension wires which are disposed to a fixed portion at four corners thereof. That is, the suspension wires have one ends fixed to the four corners of the fixed portion and other ends which are firmly fixed to the lens holding unit.

In the lens driving device disclosed in Patent Document 17, the position detection sensor is disposed at the image stabilizer coil (the second coil). And, in the manner which is described above, the Hall element is used as the position detection sensor. When the Hall element is disposed at the clearance (i.e. inside a loop portion) of the image stabilizer coil (the second coil), there is a problem in which the Hall element is subjected to an adverse effect due to a magnetic field occurring by an electric current flowing in the image stabilizer coil (the second coil). That is, in the manner which will later be described in more detail in conjunction with FIGS. 5 through 10, inversed phase occurs in a band not lower than a primary resonance frequency of the lens driving device (actuator) because moving of the magnet shifts 180 degrees in phase in compassion with a phase of the electric current flowing in the second coil (the image stabilizer coil). As a result, there is a problem in which resonance occurs in an output of the Hall element.

SUMMARY OF THE INVENTION

It is therefore an exemplary object of the present invention to provide a lens holder driving device which is capable of keeping a Hall element serving as a position detection sensor away from subjecting adverse effect due to a magnetic field occurring by an electric current flowing in a coil.

Other objects of this invention will become clear as the description proceeds.

On describing the gist of an exemplary aspect of this invention, it is possible to be understood that a lens holder driving device comprises an auto-focusing lens holder driving portion moving a lens holder holding a lens barrel along an optical axis, and an image stabilizer portion stabilizing image blurred by moving said auto-focusing lens holder driving portion in first and second directions which are orthogonal to the optical axis and which are perpendicular to each other. According to the exemplary aspect of this invention, the auto-focusing lens holder driving portion comprises a focusing coil fixed to the lens holder, a permanent magnet comprising a plurality of permanent magnet pieces which have first surfaces opposed to the focusing coil and which are disposed outsides of the focusing coil with respect to the optical axis in a radial direction so as to oppose to each other in the first direction and the second direction, a magnet holder, disposed around the periphery of the lens holder, holding said permanent magnet and having first and second ends opposite to each other in a direction of the optical axis, and first and second leaf springs, mounted to the first and the second ends of the magnet holder, supporting the lens holder in the direction of the optical direction shiftably so as to position the lens holder in the radial direction. The image stabilizer portion comprises a fixed portion disposed apart from the auto-focusing lens holder driving portion in the direction of the optical axis at a position in the vicinity of the second leaf spring, a supporting member swingably supporting the auto-focusing lens holder driving portion in the first direction and the second direction with respect to the fixed portion, an image stabilizer coil comprising a plurality of image stabilizer coil portions mounted on the fixed portion so as to oppose to second surfaces of the plurality of plurality of permanent magnet pieces that are perpendicular of to the first surfaces, the image stabilizer coil comprising specific image stabilizer coil portions, among the plurality of hand blurring correction coil portions, disposed in the first direction and the second direction, each of the specific image stabilizer coil portions being divided into a plurality of coil parts so as to separate in a longitudinal direction of the permanent magnet piece opposed thereto, and a plurality of Hall elements disposed on the fixed portion at positions where each of the specific image stabilizer coil portions are separated into the plurality of coil portions.

BRIEF DESCRIPTION OF THE DRAWING

FIG. 10 is a view tabulated for the relationships of FIGS. 9A-9C;

FIG. 17 is a view tabulated for the relationships of FIGS. 16A-16C;

DESCRIPTION OF THE PREFERRED EMBODIMENTS

Referring now to Figures, the description will proceed to exemplary embodiments of the present invention.

Figure 1:
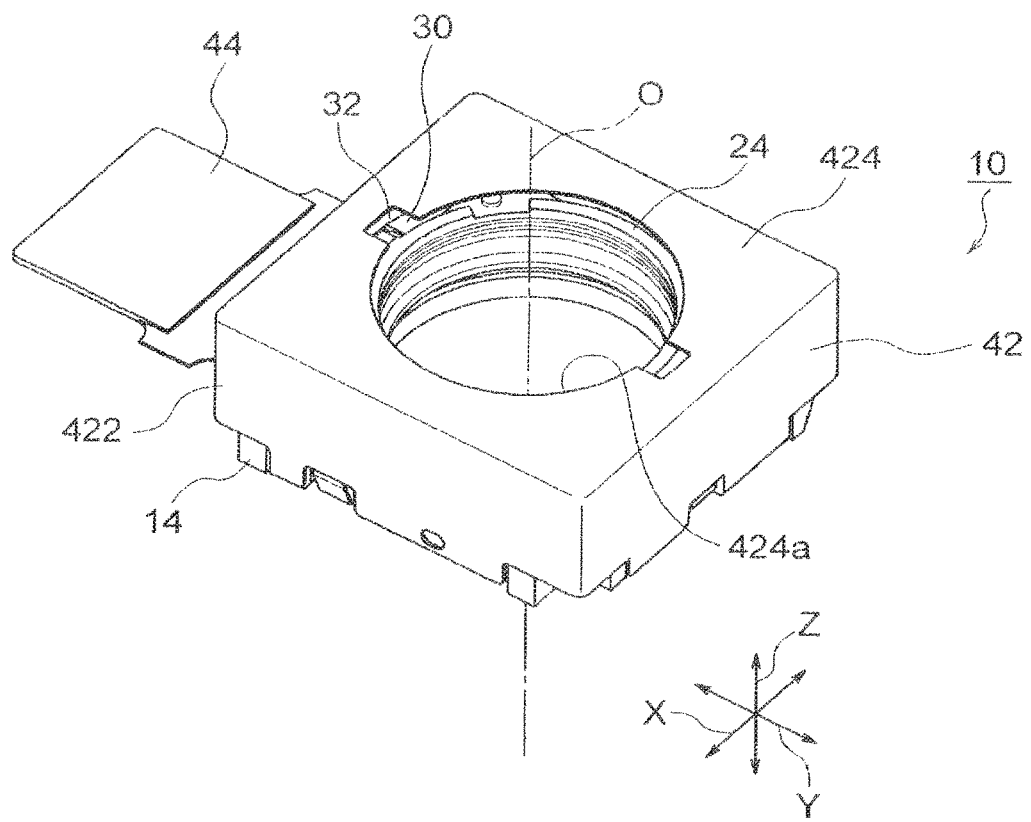
FIG. 1 is an external perspective view of a lens holder driving device according to a first exemplary embodiment of the present invention.
Figure 2:
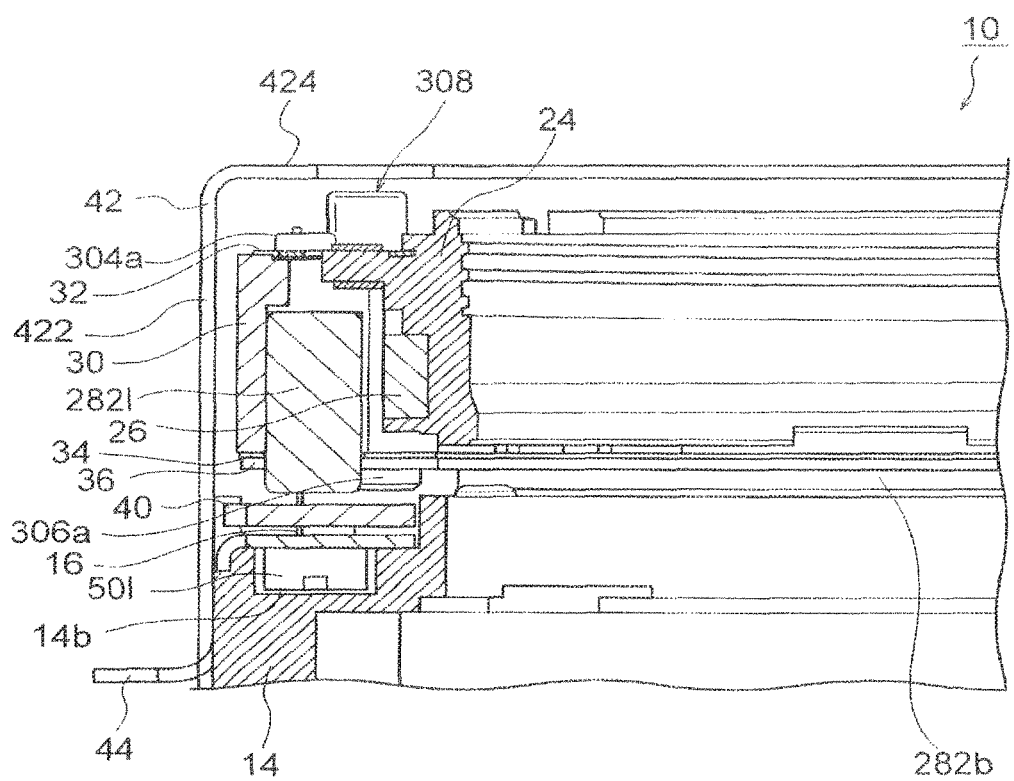
FIG. 2 is a partial vertical cross sectional view of the lens holder driving device illustrated in FIG. 1.
Figure 2:
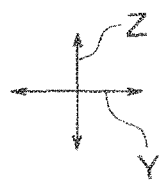
Figure 3:
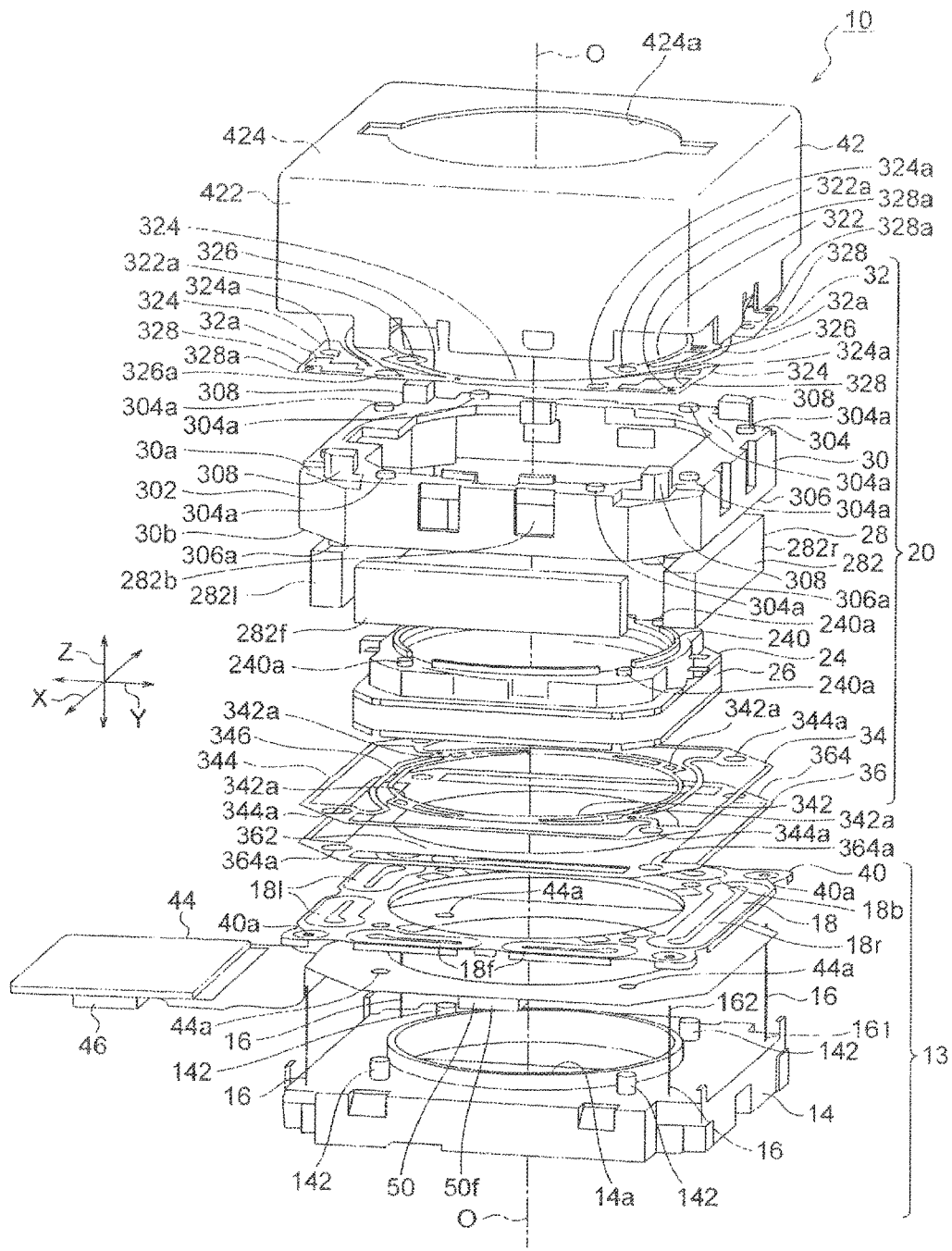
FIG. 3 is an exploded perspective view of the lens holder driving device illustrated in FIG. 1.

Referring to FIGS. 1 through 3, the description will proceed to a lens holder driving device 10 according to a first exemplary embodiment of this invention. FIG. 1 is an external perspective view of the lens holder driving device 10. FIG. 2 is a partial vertical cross sectional view of the lens holder driving device 10. FIG. 3 is an exploded perspective view of the lens holder driving device 10.

Herein, in the manner shown in FIGS. 1 through 3, an orthogonal coordinate system (X, Y, Z) is used. In a state illustrated in FIGS. 1 through 3, in the orthogonal coordinate system (X, Y, X), an X-axis direction is a fore-and-aft direction (a depth direction), a Y-axis direction is a left-and-right direction (a width direction), and a Z-axis direction is an up-and-down direction (a height direction). In addition, in the example being illustrated in FIGS. 1 through 3, the up-and-down direction Z is a direction of an optical axis O of a lens. In the first exemplary embodiment, the X-axis direction (the fore-and-aft direction) is called a first direction while the Y-axis direction (the left-and-right direction) is called in a second direction.

However, in an actual use situation, the direction of the optical axis O, namely, the Z-axis direction becomes a fore-and-aft direction. In other words, an upper direction of the Z-axis becomes a front direction while a lower direction of the Z-axis becomes a rear direction.

The illustrated lens driving device 10 is mounted to a mobile terminal such as a camera-equipped cellular mobile phone which is enable to automatic focusing, a smart phone, a notebook personal computer, a tablet-type personal computer, a mobile-type game machine, a Web camera, a vehicle-mounted camera, or the like. The lens holder driving device 10 comprises an auto-focusing lens holder driving portion 20 which will later be described, and an image stabilizer portion (which will later be described) for stabilizing blurry images (vibrations) occurring in the auto-focusing lens holder driving portion 20 upon shooting a static image using a miniature camera for the mobile terminal and is a device which is capable of picking up the image without image blurred. The image stabilizer portion of the lens holder driving device 10 stabilizes the blurry images by moving the auto-focusing lens holder driving portion 20 in the first direction (the fore-and-aft direction) X and the second direction (the left-and-right direction) Y which are orthogonal to the optical axis O and which are perpendicular to each other.

The auto-focusing lens holder driving portion 20 is for moving the lens holder 14 (which will later be described) capable of mounting a lens barrel (not shown) along the optical axis O. Apart from a bottom portion of the auto-focusing lens holder driving portion 20, a fixed portion 13 is disposed. Although illustration is not made, the fixed portion 13 has a lower portion (a rear portion) on which an image pickup device disposed on an image pickup board is mounted. The image pickup device picks up a subject image formed by the lens barrel to convert it into an electric signal. The image pickup device may, for example, comprise a CCD (charge coupled device) type image sensor, a CMOS (complementary metal oxide semiconductor) type image sensor, or the like. Accordingly, a camera module comprises a combination of the auto-focusing lens holder driving portion 20, the image pickup board, and the image pickup device.

The fixed portion 13 comprises a base 14, a coil board 40, a flexible printed circuit (FPC) 44.

The base 14 has a ring-shaped which has the outside shape of a rectangular and which has a circular opening 14a in the interior thereof.

The image stabilizer portion of the lens holder driving device 10 comprises four suspension wires 16 having first end portions 161 fixed to four corner portions of the fixed portion 13, and an image stabilizer coil 18 disposed to face a permanent magnet 28 of the auto-focusing lens holder driving portion 20 (which will later be described) in the manner which will later be described.

The four suspension wires 16 extend along the optical axis O and swingably support the auto-focusing lens holder driving portion 20 as a whole in the first direction (the fore-and-aft direction) X and the second direction (the left-and-right direction) Y. The four suspension wires 16 have second end portions 162 which are fixed to an upper end portion of the above-mentioned auto-focusing lens holder driving portion 20 in the manner which will later be described.

In the manner described above, the four suspension wires 16 serves as a supporting member for swingably supporting the auto-focusing lens holder driving portion 20 with respect to the fixed portion 13 in the first direction Y and the second direction Y.

The image stabilizer portion of the lens holder driving device 10 comprises a coil board 40 having a rectangular ring shape that is disposed apart from to face the permanent magnet 28. The coil board 40 is mounted on the base with the flexible printed circuit (FPC) 44 which will later be described is sandwiched therebetween. The above-mentioned image stabilizer coil 18 is formed on the coil board 40.

In the manner which is described above, the fixed portion 13 comprises a combination of the base 14, the coil board 40, and the flexible printed circuit (FPC) 44.

Referring now to FIG. 3, the description will proceed to the auto-focusing lens holder driving portion 20. The auto-focusing lens holder driving portion 20 is also called an AF unit.

The auto-focusing lens holder driving portion 20 comprises the lens holder 24 including a tubular portion 240 for holding the lens barrel, a ring-shaped focusing coil 26 fixed to the lens holder 24 so as to position around the tubular portion 240 thereof, a magnet holder 30 for holding the permanent magnet 28 disposed opposite to the focusing coil 26 at the outside of the focusing coil 26, and first and second leaf springs 32 and 34 mounted on first and second ends 30a and 30b of the magnetic holder 30 in the direction of the optical axis O.

The first and second springs 32 and 34 support the lens holder 24 in the direction of the optical axis O shiftably so as to position the lens holder 24 in a radial direction. In the example being illustrated, the first leaf spring 32 is called an upper leaf spring while the second leaf spring 34 is called a lower leaf spring.

In addition, in the manner which is described above, in the actual use situation, the upper direction in the Z-axis direction (the direction of the optical axis O) becomes the front direction while the lower direction in the Z-axis direction (the direction of the optical axis O) becomes the rear direction. Accordingly, the upper leaf spring 32 is also called a front-side spring while the lower leaf spring 34 is also called a rear-side spring.

The magnet holder 30 has configuration of a substantially octagonal tube. Specifically, the magnet holder 30 comprises an outer tubular portion 302 having an octagonal tubular shape, an octagonal upper ring-shaped end portion 304 provided at an upper end (a front end, the first end) 30a of the outer tubular portion 302, and an octagonal lower ring-shaped end portion 306 provided at a lower end (a rear end, the second end) 30b of the outer tubular portion 302. The upper ring-shaped end portion 304 has eight upper protrusions 304a which project at four corners upwards by two per corner. The lower ring-shaped end portion 306 has four lower protrusions 306a which project at four corners downwards.

The focusing coil 26 has an octagonal cylindrical shape which coincides with an outer shape of the magnet holder 30 having the octagonal tubular shape. The permanent magnet 28 comprises four rectangular permanent magnet pieces 282 which are disposed in the outer tubular portion 302 having the octagonal tubular shape in the magnet holder 30 so as to apart from each other in the first direction (the fore-and-aft direction) X and the second direction (the left-and-right direction) Y. The four permanent magnet pieces 282 are disposed with spaces between them and the focusing coil 26. In the example being illustrated, each permanent magnet piece 282 has an inner end side polarised (magnetized) to the north pole and an outer end side polarised (magnetized) to the south pole.

The upper leaf spring (the front-side spring) 32 is disposed at an upper side (a front side) of the lens holder 24 in the direction of the optical axis O while the lower leaf spring (the rear-side spring) 34 is disposed at a lower side (a rear side) of the lens holder 24 in the direction of the optical axis O.

The upper leaf spring (the front-side spring) 32 comprises an upper inner end portion 322 mounted on an upper end portion of the lens holder 24 in the manner which will later be described and an upper outer end portion 324 mounted on the upper ring-shaped end portion 304 of the magnet holder 30 in the manner which will later be described. Between the upper inner end portion 322 and the upper outer end portion 324, a plurality of upper arm portions 326 are provided. That is, the plurality of upper arm portions 326 connects the upper inner end portion 322 to the upper outer end portion 324.

The tubular portion 240 of the lens holder 24 has, at an upper end thereof, four upper protrusions 240a projecting at four corners upwards. The upper inner end portion 322 has four upper holes 322a in which the four upper protrusions 240a are compression inserted (charged), respectively. That is, the four upper protrusions 240a of the tubular portion 240 of the lens holder 243 are compression inserted (charged) in the four upper holes 322a of the upper inner end portion 322 of the upper leaf spring 32, respectively.

On the other hand, the upper outer end portion 324 has eight upper holes 324a in which the eight upper protrusions 34a of the magnet holder 30 are charged, respectively. That is, the eight upper protrusions 34a of the magnet holder 30 are charged in the eight upper holes 324a of the upper outer end portion 324.

The upper leaf spring (the front-side spring) 32 further comprises four arc-shaped extending portions 328 which extend at four corers of the upper outer end portion 324 in the radial direction outwards. The four arc-shaped extending portions 328 have four wire fixing holes 328a in which the second end portions 162 of the four suspension wires 16 are inserted (charged), respectively. A detailed structure of each arc-shaped extending portion 328 will later be described with reference to FIG. 19 in detail.

The lower leaf spring (the rear-side spring) 34 comprises a lower inner end portion 342 mounted on a lower end portion of the lens holder 24 in the manner which will later be described and a lower outer end portion 344 mounted on the lower ring-shaped end portion 306 of the magnet holder 30 in the manner which will later be described. Between the lower inner end portion 342 and the lower outer end portion 344, a plurality of lower arm portions 346 are provided. That is, the plurality of lower arm portions 346 connects the lower inner end portion 342 to the lower outer end portion 344.

The lower leaf spring 34 has a lower portion in which a spacer 36 having a substantially same outside shape is disposed. More specifically, the spacer 36 comprises an outer ring portion 364 having a shape which is substantially equivalent to that of the lower outer end portion 344 of the lower leaf spring 34 and an inner ring portion 364 having a shape so as to cover the lower inner end portion 342 and the lower arm portions 346 of the lower leaf spring.

The tubular portion 240 of the lens holder 24 has, at a lower end, four lower protrusions (not shown) projecting at four corners downwards. The lower inner end portion 342 has four lower holes 342a in which the four lower protrusions are compression inserted (charged), respectively. That is, the four lower protrusions of the tubular portion 240 of the lens holder 24 are compression inserted (charged) in the four lower holes 342a of the lower inner end portion 342 of the lower leaf spring 34.

On the other hand, the lower outer end portion 344 of the lower leaf spring 34 has four lower holes 344a in which the four lower protrusions 306a of the magnet holder 30 are charged, respectively. The outer ring portion 364 of the spacer 36 also has four lower holes 364a in which the four lower protrusions 306a of the magnet holder 30 are compression inserted at positions corresponding to the four lower holes 344a, respectively. That is, the four lower protrusions 306a of the magnet holder 30 are compression inserted in the four lower holes 364a of the outer ring portion 364 of the spacer 36 via the four lower holes 344a of the lower outer end portion 344 of the lower leaf spring 34, respectively.

An elastic member comprising the upper leaf spring 32 and the lower leaf spring 34 serves as a guiding arrangement for guiding the lens holder 24 so as to be movable in the direction of the optical axis O alone. Each of the upper leaf spring 32 and the lower leaf spring 34 is made of beryllium copper, phosphor bronze, or the like.

The tubular portion 240 of the lens holder 24 has an inner wall in which a female screw thread (not shown) is cut. On the other hand, although the illustration is not made, the lens barrel has an outer wall in which a male screw thread screwed in the above-mentioned female screw thread is cut. In a case of fitting the lens barrel to the lens holder 24, it includes the steps of rotating the lens barrel with respect to the tubular portion 240 of the lens holder 24 around the optical axis O to screw it along the direction of the optical axis O thereby accommodating the lens barrel in the lens holder 24, and of connecting them to each other via an adhesive agent or the like.

In the manner which will later be described, by flowing an auto-focusing (AF) current through the focusing coil 26, it is possible to positionally adjust the lens holder 24 (the lens barrel) in the direction of the optical axis O according to interaction between a magnetic field of the permanent magnet 28 and a magnetic field due to the AF current flowing through the focusing coil 26.

In the manner which is described above, the auto-focusing lens holder driving portion (the AF unit) 20 comprises the lens holder 24, the focusing coil 26, the permanent magnet 28, the magnet holder 30, the upper leaf spring 32, the lower leaf spring 34, and the spacer 36.

Referring now to FIG. 3, the description will proceed to the image stabilizer portion of the lens holder driving device 10 in more detail.

In the manner which is described above, the image stabilizer portion of the lens holder driving device 10 comprises the four suspension wires 16 having the first end portion 161 fixed to the fixed portion 13 at the four corner portions thereof, and the image stabilizer coil 18 disposed to face the permanent magnet 28 of the above-mentioned auto-focusing lens holder driving portion 20.

The four suspension wires 16 extend along the optical axis O and swingably support the auto-focusing lens holder driving portion 20 as a whole in the first direction (the fore-and-aft direction) X and the second direction (the left-and-right direction) Y. The four suspension wires 16 have the second end portions 162 which are fixed to the upper end portion of the above-mentioned auto-focusing lens holder driving portion 20.

More specifically, in the manner which is described above, the four arc-shaped extending portions 328 of the upper leaf spring 32 have the four wire fixing holes 328a in which the second end portions 162 of the four suspension wires 16 are inserted (charged), respectively (see, FIG. 3). In the four wire fixing holes 328a, the second end portions 162 of the four suspension wires 16 are inserted (charged) and are fixed by means of an adhesive agent, solder, or the like.

Although each arc-shaped extending portion 328 has an L-shape in the example being illustrated, of course, it is not limited to this.

Two of the four suspension wires 16 are also used to feed to the focusing coil 26.

In the manner which is described above, the permanent magnet 28 comprises the four permanent magnet pieces 282 which are disposed so as to oppose to each other in the first direction (the fore-and-aft direction) X and the second direction (the left-and-right direction) Y.

The image stabilizer portion of the lens holder driving device 10 comprises the ring-shaped coil board 40 which is inserted between the four permanent magnet pieces 282 and the base 14 and which is disposed so as to apart from them. The coil board 40 has, at four corners thereof, four through holes 40a through which the four suspension wires 16 pass and in which the first end portions 161 are fixed. The above-mentioned image stabilizer coil 18 is formed on the coil board 40.

Herein, in the four permanent magnet pieces 282, the permanent magnet pieces disposed with respect to the optical axis O at a front side, a rear side, a left side, and a right side are called a front-side permanent magnet piece 282f, a rear-side permanent magnet piece 282r, a left-side permanent magnet piece 282l, and a right-side permanent magnet piece 282r, respectively.

Figure 4:
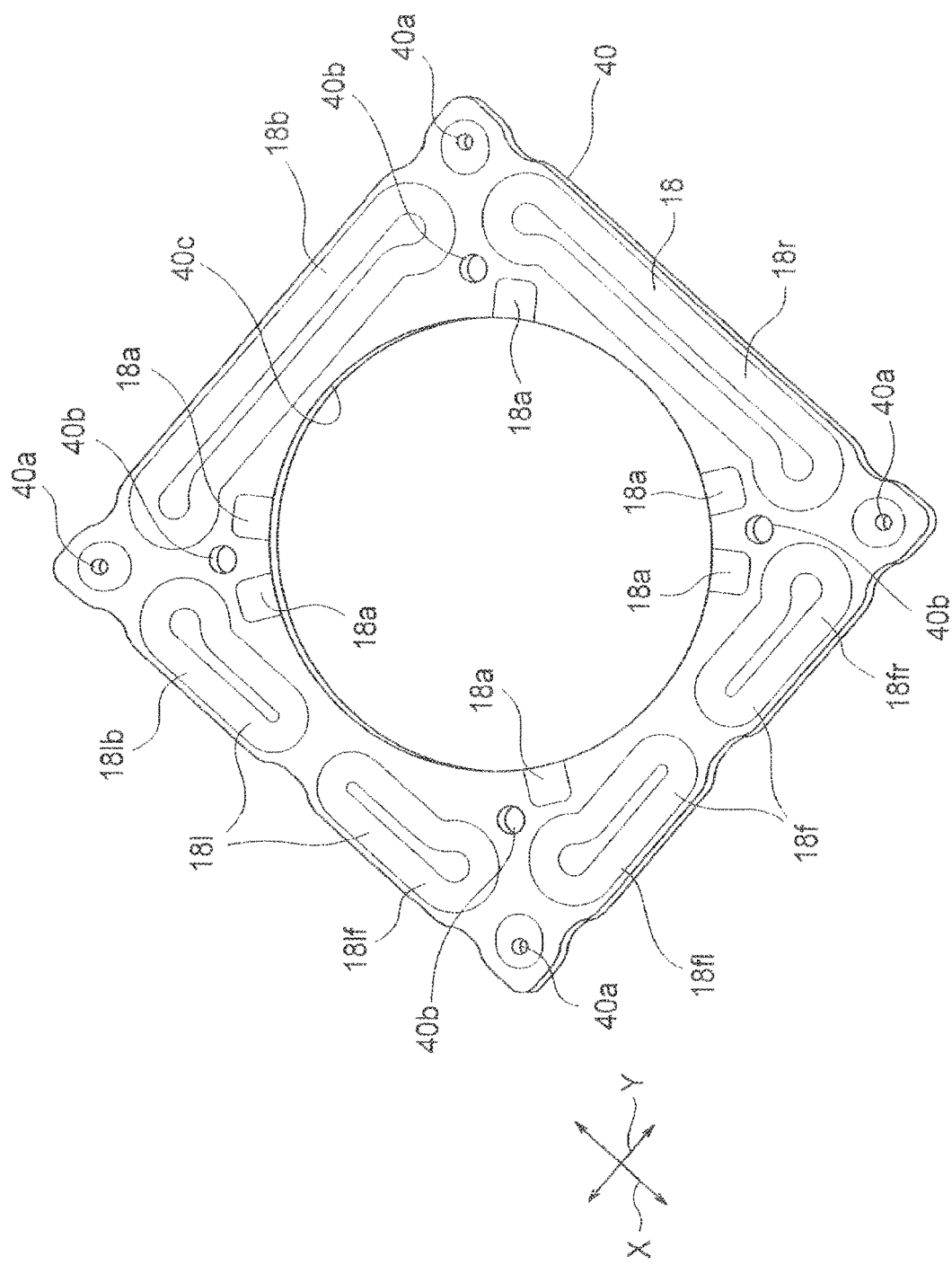
FIG. 4 is a perspective view of a coil board and an image stabilizer coil formed therein which are used in the lens holder driving device illustrated in FIG. 1.

Referring to FIG. 4 also, on the coil board 40, four image stabilizer coil portions 18f, 18b, 18l, and 18r are formed as the image stabilizer coil 18.

Disposed opposite to each other in the first direction (the fore-and-aft direction) X, the two image stabilizer coil portions 18f and 18b are for moving (swinging) the auto-focusing lens holder driving portion (the AF unit) 20 in the first direction (the fore-and-aft direction) X. Such two image stabilizer coil portions 18f and 18b are collectively called a first direction actuator. Herein, the image stabilizer coil portion 18f disposed at a front side with respect to the optical axis O is called "a front-side image stabilizer coil portion" while the image stabilizer coil portion 18b disposed at a back side with respect to the optical axis O is called "a back-side image stabilizer coil portion".

On the other hand, disposed opposite to each other in the second direction (the left-and-right direction) Y, the two image stabilizer coil portions 18l and 18r are for moving (swinging) the auto-focusing lens holder driving portion (the AF unit) 20 in the second direction (the left-and-right direction) Y. Such two image stabilizer coil portions 18l and 18r are collectively called a second direction actuator. Herein, the image stabilizer coil portion 18l disposed at a left side with respect to the optical axis O is called "a left-side image stabilizer coil portion" while the image stabilizer coil portion 18r disposed at a right side with respect to the optical axis O is called "a right-side image stabilizer coil portion".

As shown in FIG. 4, in the illustrated image stabilizer coil 18, each of the front-side image stabilizer coil portion 18f and the left-side image stabilizer coil portion 18l is divided into two coil parts so as to separate at a center in a longitudinal direction of the front-side permanent magnet piece 182f and the left-side permanent magnet piece 182l opposite thereto, respectively. That is, the front-side image stabilizer coil portion 18f comprises a left-side coil part 18fl and a right-side coil part 18fr. Likewise, the left-side image stabilizer coil portion 18l comprises a front-side coil part 18lf and a back-side coil part 18lb.

In other words, each of the front-side image stabilizer coil portion 18f and the left-side image stabilizer coil portion 18r comprises two loop portions while each of the back-side image stabilizer coil portion 18b and the right-side image stabilizer coil portion 18r comprises only one loop portion.

In the manner which is described above, among the four image stabilizer coil portions 18f, 18b, 18l, and 18r, each of two particular image stabilizer coil portions 18f and 18l disposed in the first direction X and the second direction Y is divided into the two coil parts 18fl, 18fr and 18lf, 18lb so as to separate it at the center of the longitudinal direction of the permanent magnet pieces 282f and 282l opposite thereto.

The four image stabilizer coil portions 18f, 18b, 18l, and 18r configured as described above in cooperation with the permanent magnet 28 are for driving the auto-focusing lens holder driving portion (the AF unit) 20 as a whole in the X-axis direction (the first direction) and the Y-axis direction (the second direction). A combination of the four image stabilizer coil portions 18f, 18b, 18l, and 18r and the permanent magnet 28 serves as a voice coil motor (VCM).

In the manner which is described above, the illustrated image stabilizer portion of the lens holder driving device 10 stabilizes the blurry images by moving the lens barrel received in the auto-focusing lens holder driving portion (the AF unit) 20 in itself in the first direction (the fore-and-aft direction) X and the second direction (the left-and-right direction) Y. Accordingly, the image stabilizer portion of the lens holder driving device 10 is called an image stabilizer portion of "a barrel shift method".

Turning back to FIG. 3, the lens holder driving device 10 further comprises a shielding cover 42 for covering the auto-focusing lens holder driving portion (the AF unit) 20. The shielding cover 42 comprises a rectangular tubular portion 422 for covering an outer periphery of the auto-focusing lens holder driving portion (the AF unit) 20 and a ring-shaped upper end portion 424 for covering an upper surface of the auto-focusing lens holder driving portion (the AF unit) 20. The upper end portion 424 has a circular opening 424a concentric with the optical axis O.

The illustrated image stabilizer portion of the lens holder driving device 10 further comprises a position detection arrangement 50 for detecting a position of the auto-focusing lens holder driving portion (the AF unit) 20 with respect to the base 14 (the fixed portion 13). The illustrated position detection arrangement 50 comprises a magnetic position detection arrangement comprising two Hall elements 50f and 50l mounted on the base 14 (see, FIG. 11). The two Hall elements 50f and 50l are disposed so as to oppose with a space to two of the four permanent magnet pieces 282, respectively, in the manner which will later be described. As shown in FIG. 2, each Hall element 50f and 50l is disposed so as to cross in a direction from the north pole to the south pole in the permanent magnet piece 282.

In the example being illustrated, one Hall element 50f is called a front-side Hall element because the Hall element 50f is disposed at a front side in the first direction (the fore-and-aft direction) X with respect to the optical axis O. Another Hall element 50l is called a left-side Hall element because the Hall element 50l is disposed at a left side in the second direction (the left-and-right direction) Y with respect to the optical axis O.

The front-side Hall element 50f is disposed on the base 14 at a position where the front-side image stabilizer coil portion 18f having the divided two coil parts 18fl and 18fr is separated into the two coil parts 18fl and 18fr. Similarly, the left-side Hall element 50l is disposed on the base 14 at a position where the left-side image stabilizer coil portion 18l having the divided two coil parts 18lf and 18lb is separated into the two coil parts 18lf and 18lb.

In the manner which is described above, the two Hall elements 50f and 50l are disposed on the base 14 at the positions where particular two image stabilizer coil portions 18f and 18l having the divided two coil parts 18fl, 18fr and 18lf, 18lb are separated into two coil parts 18fl, 18fr and 18lf, 191b.

The front-side Hall element 50f detects a first position with a movement (a swing) in the first direction (the fore-and-aft direction) X by detecting a magnetic force of the front-side permanent magnet piece 282f opposite thereto. The left-side Hall element 50l detects a second position with a movement (a swing) in the second direction (the left-and-right direction) Y by detecting a magnetic force of the left-side permanent magnet piece 282l opposite thereto.

Figure 5:
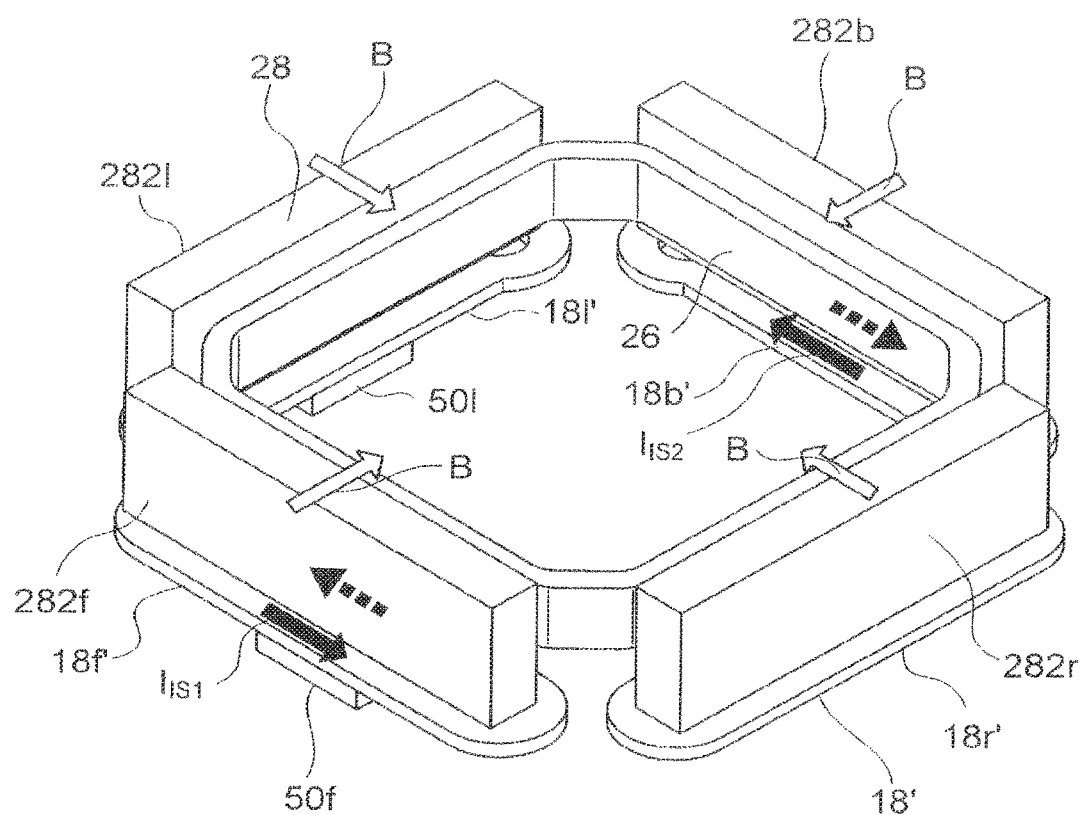
FIG. 5 is a perspective view showing a relationship between a related magnetic circuit and Hall elements.
Figure 6:
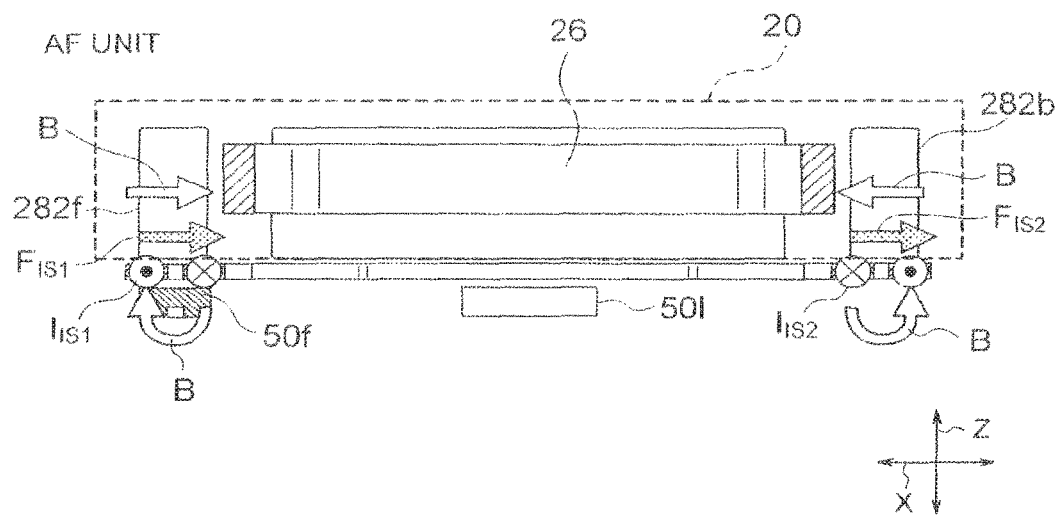
FIG. 6 is a vertical cross sectional view showing a relationship between the related magnetic circuit and the Hall elements.
Figure 7:
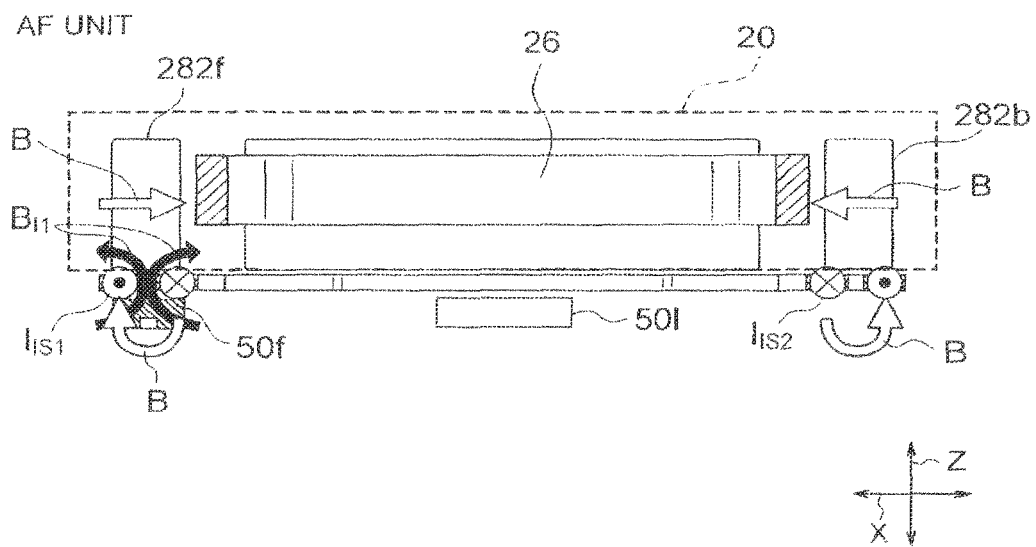
FIG. 7 is a vertical cross sectional view shoring a relationship between the related magnetic circuit and the Hall elements in a case of displacing an AF unit in a fore-and-aft direction X.

Referring to FIGS. 5 through 7, the description will proceed to a relationship between a related magnetic circuit and Hall elements for use in a related lens holder driving device in order to facilitate the understanding of the lens holder driving device 10 according to the first exemplary embodiment of the present invention. The relationship between the illustrated related magnetic circuit and the Hall elements is similar in structure (relationship) to that illustrated in the above-mentioned Patent Document 17. FIG. 5 is a perspective view showing the relationship between the related magnetic circuit and the Hall elements, FIG. 6 is a vertical cross sectional view showing the relationship between the related magnetic circuit and the Hall elements, and FIG. 7 is a vertical cross sectional view shoring the relationship between the related magnetic circuit and the Hall elements in a case of displacing the AF unit 20 in the fore-and-aft direction X.

A difference between the related magnetic circuit and the magnetic circuit used in the lens holder driving device 10 according to this exemplary embodiment is that any of four image stabilizer coil portions 18f', 18b', 18l', and 18r' constituting an image stabilizer coil 18' in the related magnetic circuit comprises no two loop ports. That is, in the related magnetic circuit, each of the four image stabilizer coil portions 18f', 18b', 18l', and 18r' comprises only one loop part.

As described above, each of the four permanent magnet pieces 282f, 282b, 282l, and 282r has the inner side polarized (magnetized) to the north pole and the outer side polarized (magnetized) to the south pole. Arrows B depicted in FIG. 5 indicate directions of magnetic fluxes generated by the permanent magnet pieces.

Referring now to FIG. 5, the description will be made as regards operation in a case of position adjusting the lens holder 24 (the lens barrel) in the direction of the optical axis O by using the related magnetic circuit.

By way of illustration, it will be assumed that the AF current is flowed through the focusing coil 26 counterclockwise. In this event, according to Fleming's right-hand rule, the focusing coil 26 is acted upon by an electromagnetic force upwards. As a result, it is possible to move the lens holder 24 (the lens barrel) in the direction of the optical axis O upwards.

Conversely, by flowing the AF current through the focusing coil 26 clockwise, it is possible to move the lens holder 24 (the lens barrel) in the direction of the optical axis O downwards.

Referring now to FIGS. 5 to 7, the description will be made as regards operation in a case of moving the auto-focusing lens holder driving portion (the AF unit) 20 as a whole in the first direction (the fore-and-aft direction) X or the second direction (the left-and-right direction) Y by using the related magnetic circuit.

First, the description will be made as regards operation in a case of moving the auto-focusing lens holder driving portion (the AF unit) 20 as a whole in the first direction (the fore-and-aft direction) X backwards. In this event, as shown in FIG. 5, a first image stabilizing (IS) current flows through the front-side image stabilizer coil portion 18f' counterclockwise as depicted at an arrow $I_{IS1}$ and a second image stabilizing (IS) current flows through the back-side image stabilizer coil portion 18b' clockwise as depicted at an arrow $I_{IS2}$.

In this event, according to Fleming's right-hand rule, the front-side image stabilizer coil portion 18f' is acted upon by an electromagnetic force forwards and the back-side image stabilizer coil portion 18b' is also acted upon by an electromagnetic force forwards. However, inasmuch as there image stabilizer coil portions 18f' and 18r' are fixed to the base 14 (the fixed portion 13), as reaction, the auto-focusing lens holder driving portion (the AF unit) 20 as a whole is acted upon by an electromagnetic force backwards, as depicted at arrows $F_{IS1}$ and $F_{IS2}$ in FIG. 6. As a result, it is possible to move the auto-focusing lens holder driving portion (the AF unit) 20 as a whole backwards.

Conversely, by flowing the first IS current through the front-side image stabilizer coil portion 18f' clockwise and by flowing the second IS current through the back-side image stabilizer coil portion 18b' counterclockwise, it is possible to move the auto-focusing lens holder driving portion (the AF unit) 20 as a whole forwards.

On the other hand, by flowing a third IS current through the left-side image stabilizer coil portion 18l' counterclockwise and by flowing a fourth IS current through the right-side image stabilizer coil portion 18r' clockwise, it is possible to move the auto-focusing lens holder driving portion (the AF unit) 20 as a whole rightwards.

In addition, by flowing the third IS current through the left-side image stabilizer coil portion 18l' clockwise and by flowing the fourth IS current through the right-side image stabilizer coil portion 18r' counterclockwise, it is possible to move the auto-focusing lens holder driving portion (the AF unit) 20 as a whole leftwards.

In the manner which is described above, it is possible to stabilize blurry images.

Figure 8:
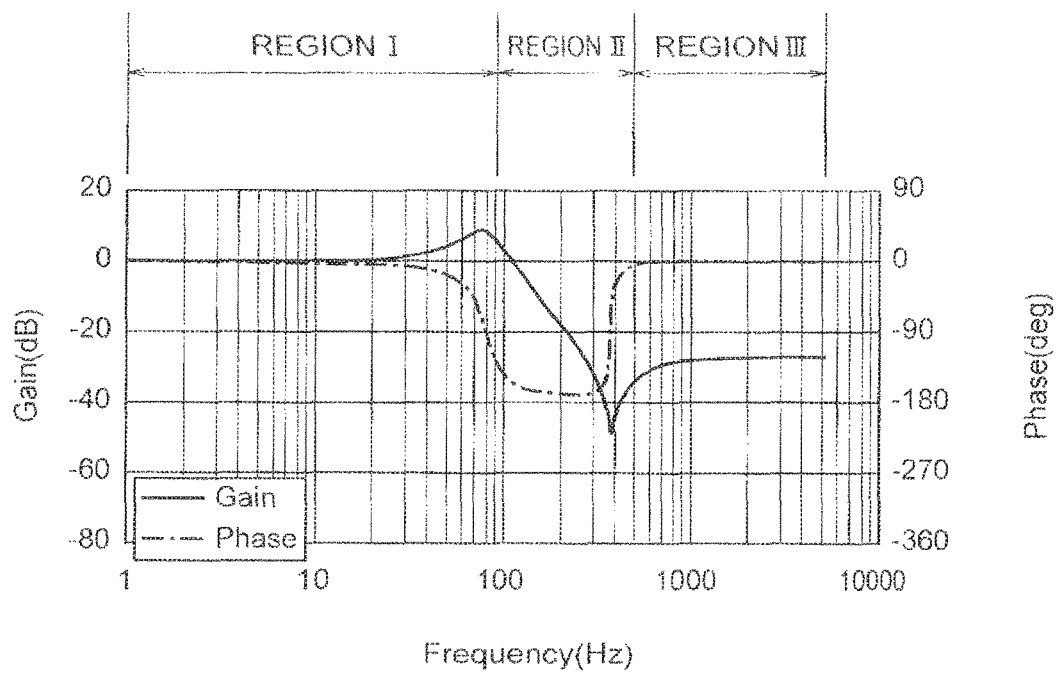
FIG. 8 is a view showing a frequency response of a front-side Hall element in the related magnetic circuit.

Referring now to FIGS. 8 through 10 in addition to FIGS. 5 through 7, the description will proceed to problems in the related lens holder driving device using the related magnetic circuit in more details.

The description will be made as taking a case as an example where the first IS current flows through the front-side image stabilizer coil portion 18f' counterclockwise as depicted at the arrow $I_{IS1}$ and the second IS current flows through the back-side image stabilizer coil portion 18b' clockwise as depicted at the arrow $I_{IS2}$, as shown in FIG. 5, in order to move the auto-focusing lens holder driving portion (the AF unit) 20 as a whole backwards in the manner which is described above.

In this event, as shown in FIG. 7, it is understood that a magnetic field $B_{11}$ produced by the first IS current $I_{IS1}$ flowing through the front-side image stabilizer coil portion 18f' and the magnetic field B produced by the front-side permanent magnet piece 282f are in phase. It will be assumed that magnetic flux density of the magnetic field B is indicated by a and magnetic flux density of the magnetic field $B_{11}$ is indicated by b. Accordingly, it is understood that the front-side Hall element 50f detects total magnetic flux density (a+b) obtained by summing the magnetic flux density a of the magnetic field B and the magnetic flux density b of the magnetic field $B_{11}$.

It is herein noted that it is necessary that the magnetic flux density a of the magnetic field B and the total magnetic flux density (a+b) are in phase in order to detect a position of the auto-focusing lens holder driving portion (the AF unit) 20 by means of the front-side Hall element 50f.

FIG. 8 is a view showing a frequency response of the front-side Hall element 50f in the related magnetic circuit. In FIG. 8, the horizontal axis represents a frequency (Frequency) (Hz), the left-hand vertical axis represents a gain (Gain) (dB), and the right-hand vertical axis represents a phase (Phase) (deg). In addition, in FIG. 8, a solid line indicates a gain characteristic and an alternate long and short dashed line indicate a phase characteristic.

As is apparent from FIG. 8, the frequency response of the font-side Hall element 50f is divided into a region I, a region II, and a region III. The region I is a region having a band not higher than a primary resonance frequency of the actuator and having low frequencies. The region II is a region having a band not lower than the primary resonance frequency of the actuator and having middle frequencies. The region III is a region having a band not lower than the primary resonance frequency of the actuator and having high frequencies.

Figure 9A:
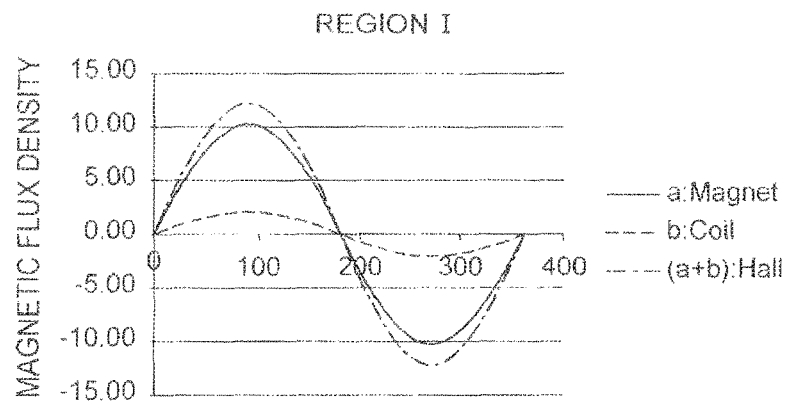
FIGS. 9A, 9B, and 9C are views showing relationships between phases and magnitudes among a magnetic flux density a of a magnetic field B generated by the a front-side permanent magnetic piece, a magnetic flux density b of a magnetic field B.sub.11 generated by a first IS current I.sub.IS1 flowing through a front-side image stabilizer coil, and a total magnetic flux density (a+b) detected by the front-side Hall element in a region I, a region II, and a region III of FIG. 8, respectively.
Figure 9B:
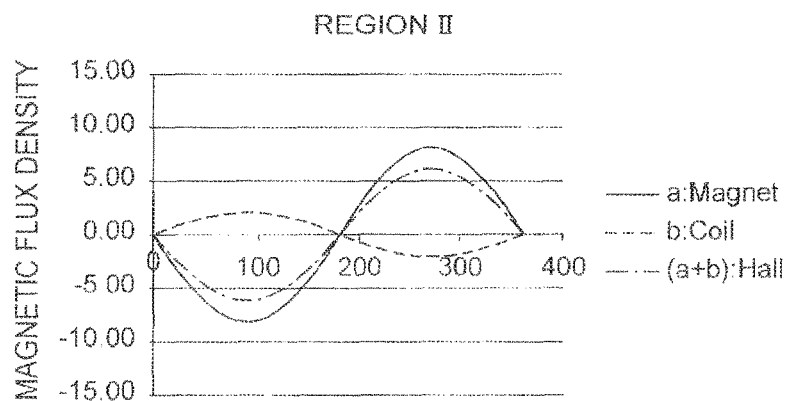
Figure 9C:
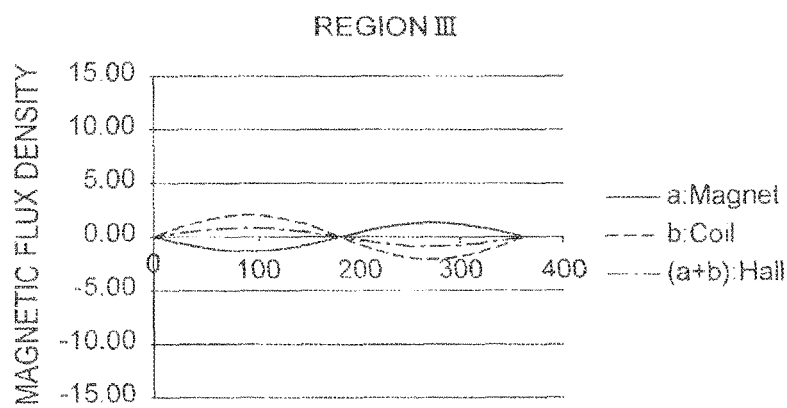

FIGS. 9A, 9B, and 9C are views showing relationships between phases and magnitudes among the magnetic flux density a of the magnetic field B generated by the front-side permanent magnetic piece 282f, the magnetic flux density b of the magnetic field $B_{11}$ generated by the first IS current $I_{IS1}$ flowing through the front-side image stabilizer coil 18f', and the total magnetic flux density (a+b) detected by the front-side Hall element 50f in the region I, the region II, and the region III of FIG. 8, respectively. FIG. 10 is a view tabulated for the relationships of FIGS. 9A-9C;

It is understood from FIGS. 9A-9C and 10 as follows.

In the band not higher than the primary resonance frequency of the region I, a magnitude |a| of the magnetic flux density a of the magnetic field B is larger than a magnitude |b| of the magnetic flux density b of the magnetic field B.sub.11 (|a|>|b|), and the magnetic flux density a of the magnetic field B, the magnetic flux density b of the magnetic field B.sub.11, and the total magnetic flux density (a+b) are in phase. Accordingly, in the region I, it is possible to detect the position of the auto-focusing lens holder driving portion (the AF unit) 20 by means of the front-side Hall element 50f.

On the other hand, in a band not lower than primary resonance frequency, the magnetic flux density a of the magnetic field B and the magnetic flux density b of the magnetic field B.sub.11 are opposite phase because movement of the front-phase permanent magnet piece 282f shifts with respect to a phase of the first IS current I.sub.IS1 flowing through the front-side image stabilizer coil portion 18f by 180 degrees.

In the band not lower than the primary resonance frequency of the region II, the magnetic flux density a of the magnetic field B and the total magnetic flux density (a+b) are in phase because the magnitude |a| of the magnetic flux density a of the magnetic field B is larger than a magnitude |b| of the magnetic flux density b of the magnetic field B.sub.11 (|a|>|b|). Accordingly, in the region II, it is possible to detect the position of the auto-focusing lens holder driving portion (the AF unit) 20 by means of the front-side Hall element 50f.

However, in the band not lower than the primary resonance frequency of the region III, it is understood that the magnitude |a| of the magnetic flux density a of the magnetic field B is smaller than a magnitude |b| of the magnetic flux density b of the magnetic field B.sub.11 (|a|<.ident.b|). Therefore, the magnetic flux density a of the magnetic field B and the total magnetic flux density (a+b) are opposite phase. As a result, in the region III, it is impossible to detect the position of the auto-focusing lens holder driving portion (the AF unit) 20 by means of the front-side Hall element 50f. That is, an output of Hall element has resonance.

Accordingly, when the Hall element is disposed between (in) the loop part of the coil, it is understood that it is impossible to detect the position of the auto-focusing lens holder driving portion (the AF unit) 20 in the region III which is not lower than the primary resonance frequency. In other words, the Hall elements 50f and 50l are subjected to adverse effect caused by the magnetic fields generated by the currents flowing through the image stabilizer coil portions 18f and 18l, respectively.

Figure 11:
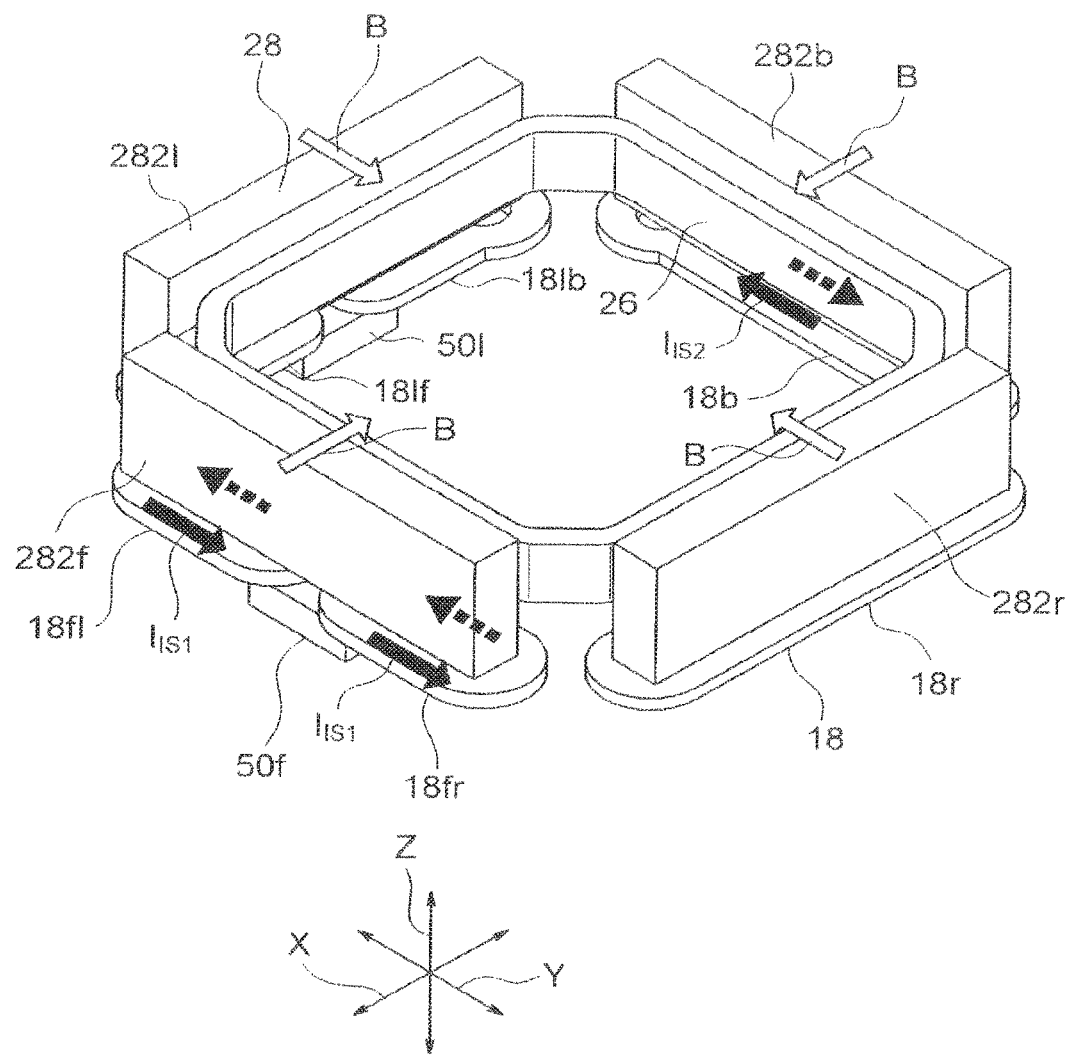
FIG. 11 is a perspective view showing a relationship between a magnetic circuit and Hall elements for use in the lens holder driving device illustrated in FIG. 1.
Figure 12:
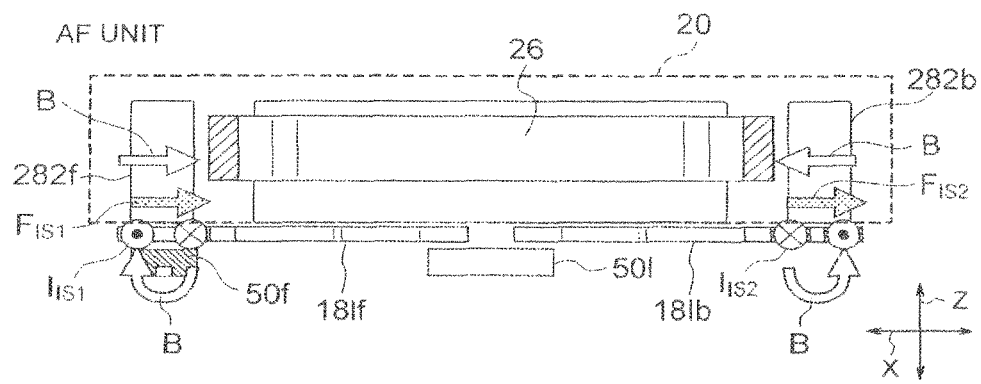
FIG. 12 is a vertical cross sectional view showing a relationship between the magnetic circuit and the Hall elements illustrated in FIG. 11.
Figure 13:
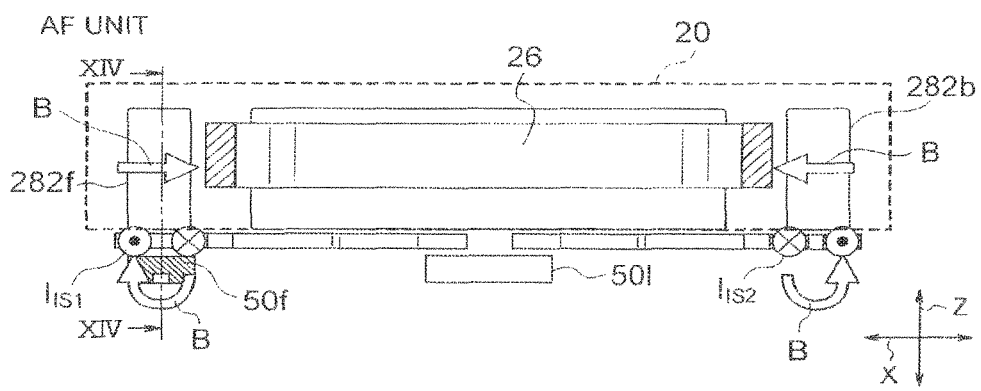
FIG. 13 is a vertical cross sectional view showing a relationship between the magnetic circuit and the Hall elements illustrated in FIG. 11 in a case of displacing an AF unit in a fore-and-aft direction X.
Figure 14:
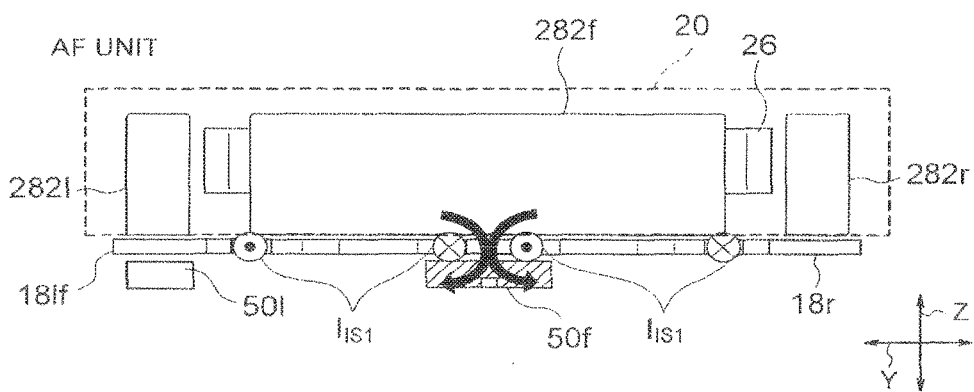
FIG. 14 is a cross sectional view taken on line XIV-XIV of FIG. 13.

Referring now to FIGS. 11 through 14, the description will proceed to a relationship between the magnetic circuit according to this exemplary embodiment and the Hall elements for use in the lens holder driving device 10 according to the first exemplary embodiment of this invention. FIG. 11 is a perspective view showing the relationship between the magnetic circuit according to this exemplary embodiment and the Hall elements, FIG. 12 is a vertical cross sectional view showing the relationship between the magnetic circuit according to this exemplary embodiment and the Hall elements, FIG. 13 is a vertical cross sectional view shoring the relationship between the magnetic circuit according to this exemplary embodiment and the Hall elements in a case of displacing the AF unit 20 in the fore-and-aft direction X, and FIG. 14 is a cross sectional view taken on line XIV-XIV of FIG. 13.

As described above, each of the four permanent magnet pieces 282f, 282b, 282l, and 282r has the inner side polarized (magnetized) to the north pole and the outer side polarized (magnetized) to the south pole. Arrows B depicted in FIG. 11 indicate directions of magnetic fluxes generated by the permanent magnet pieces.

Referring now to FIG. 11, the description will be made as regards operation in a case of position adjusting the lens holder 24 (the lens barrel) in the direction of the optical axis O by using the magnetic circuit according to this exemplary embodiment.

By way of illustration, it will be assumed that the AF current is flowed through the focusing coil 26 counterclockwise. In this event, according to Fleming's right-hand rule, the focusing coil 26 is acted upon by an electromagnetic force upwards. As a result, it is possible to move the lens holder 24 (the lens barrel) in the direction of the optical axis O upwards.

Conversely, by flowing the AF current through the focusing coil 26 clockwise, it is possible to move the lens holder 24 (the lens barrel) in the direction of the optical axis O downwards.

Referring now to FIGS. 11 to 14, the description will be made as regards operation in a case of moving the auto-focusing lens holder driving portion (the AF unit) 20 as a whole in the first direction (the fore-and-aft direction) X or the second direction (the left-and-right direction) Y by using the magnetic circuit according to this exemplary embodiment.

First, the description will be made as regards operation in a case of moving the auto-focusing lens holder driving portion (the AF unit) 20 as a whole in the first direction (the fore-and-aft direction) X backwards. In this event, as shown in FIG. 11, a first image stabilizing (IS) current flows through each of the tow coil parts 18fl and 18fr of the front-side image stabilizer coil portion 18f counterclockwise as depicted at an arrow I.sub.IS1 and a second image stabilizing (IS) current flows through the back-side image stabilizer coil portion 18b clockwise as depicted at an arrow I.sub.IS2.

In this event, according to Fleming's right-hand rule, the front-side image stabilizer coil portion 18f is acted upon by an electromagnetic force forwards and the back-side image stabilizer coil portion 18b is also acted upon by an electromagnetic force forwards. However, inasmuch as there image stabilizer coil portions 18f and 18r are fixed to the base 14 (the fixed portion 13), as reaction, the auto-focusing lens holder driving portion (the AF unit) 20 as a whole is acted upon by an electromagnetic force backwards, as depicted at arrows F.sub.IS1 and F.sub.IS2 in FIG. 12. As a result, it is possible to move the auto-focusing lens holder driving portion (the AF unit) 20 as a whole backwards.

Conversely, by flowing the first IS current through each of the two coil parts 18fl and 18fr of the front-side image stabilizer coil portion 18f clockwise and by flowing the second IS current through the back-side image stabilizer coil portion 18b counterclockwise, it is possible to move the auto-focusing lens holder driving portion (the AF unit) 20 as a whole forwards.

On the other hand, by flowing a third IS current through each of the two coil parts 18lf and 18lb of the left-side image stabilizer coil portion 18l counterclockwise and by flowing a fourth IS current through the right-side image stabilizer coil portion 18r clockwise, it is possible to move the auto-focusing lens holder driving portion (the AF unit) 20 as a whole rightwards.

In addition, by flowing the third IS current through each of the two coil parts 18lf and 18lr of the left-side image stabilizer coil portion 18l clockwise and by flowing the fourth IS current through the right-side image stabilizer coil portion 18r counterclockwise, it is possible to move the auto-focusing lens holder driving portion (the AF unit) 20 as a whole leftwards.

In the manner which is described above, it is possible to stabilize blurry images in the camera.

Figure 15:
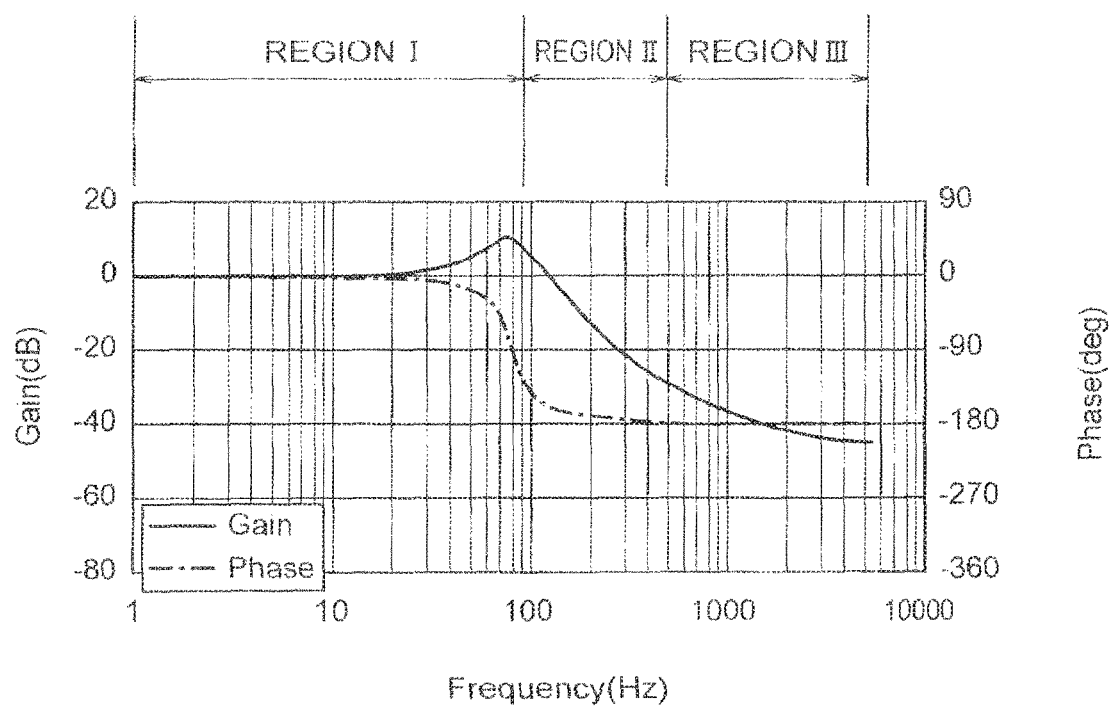
FIG. 15 is a view showing a frequency response of a front-side Hall element in the magnetic circuit illustrated in FIG. 11.

Referring now to FIGS. 15 through 17 in addition to FIGS. 11 through 14, the description will proceed to advantages in the lens holder driving device 10 using the magnetic circuit according to this exemplary embodiment in more details.

The description will be made as taking a case as an example where the first IS current flows through each of the two coil parts 18fl and 18fr of the front-side image stabilizer coil portion 18f counterclockwise as depicted at the arrow $I_{IS1}$ and the second IS current flows through the back-side image stabilizer coil portion 18b clockwise as depicted at the arrow $I_{IS2}$, as shown in FIG. 11, in order to move the auto-focusing lens holder driving portion (the AF unit) 20 as a whole backwards in the manner which is described above.

In this event, as shown in FIGS. 13 and 14, it is understood that a magnetic field $B_{11}$ produced by the first IS current $I_{IS1}$ flowing through the front-side image stabilizer coil portion 18f and the magnetic field B produced by the front-side permanent magnet piece 282f are opposite phase. It will be assumed that magnetic flux density of the magnetic field B is indicated by a and magnetic flux density of the magnetic field $B_{11}$ is indicated by b. Accordingly, it is understood that the front-side Hall element 50f detects total magnetic flux density (a+b) obtained by summing the magnetic flux density a of the magnetic field B and the magnetic flux density b of the magnetic field $B_{11}$.

It is herein noted that it is necessary that the magnetic flux density a of the magnetic field B and the total magnetic flux density (a+B) are in phase in order to detect a position of the auto-focusing lens holder driving portion (the AF unit) 20 by means of the front-side Hall element 50f.

FIG. 15 is a view showing a frequency response of the front-side Hall element 50f in the magnetic circuit according to this exemplary embodiment. In FIG. 15, the horizontal axis represents a frequency (Frequency) (Hz), the left-hand vertical axis represents a gain (Gain) (dB), and the right-hand vertical axis represents a phase (Phase) (deg). In addition, in FIG. 15, a solid line indicates a gain characteristic and an alternate long and short dashed line indicate a phase characteristic.

As is apparent from FIG. 15, the frequency response of the font-side Hall element 50f is divided into a region I, a region II, and a region III. The region I is a region having a band not higher than a primary resonance frequency of the actuator and having low frequencies. The region II is a region having a band not lower than the primary resonance frequency of the actuator and having middle frequencies. The region III is a region having a band not lower than the primary resonance frequency of the actuator and having high frequencies.

Figure 16A:
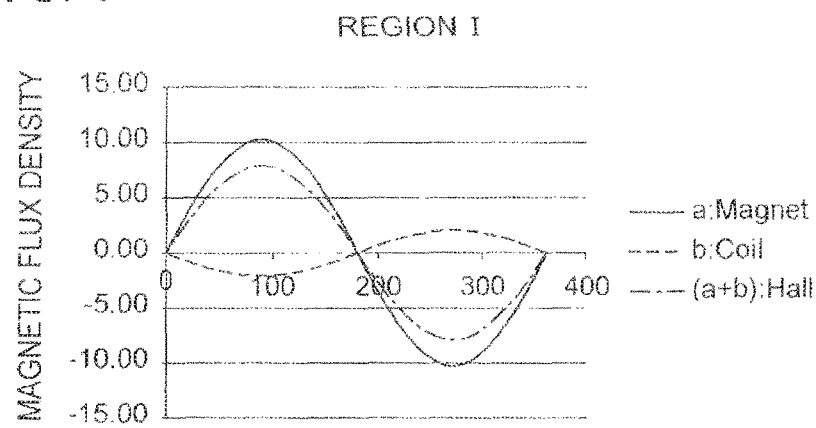
FIGS. 16A, 16B, and 16C are views showing relationships between phases and magnitudes among a magnetic flux density a of a magnetic field B generated by the a front-side permanent magnetic piece, a magnetic flux density b of a magnetic field B.sub.11 generated by a first IS current IIS1 flowing in a front-side image stabilizer coil, and a total magnetic flux density (a+b) detected by the front-side Hall element in a region I, a region II, and a region III of FIG. 15, respectively.
Figure 16B:
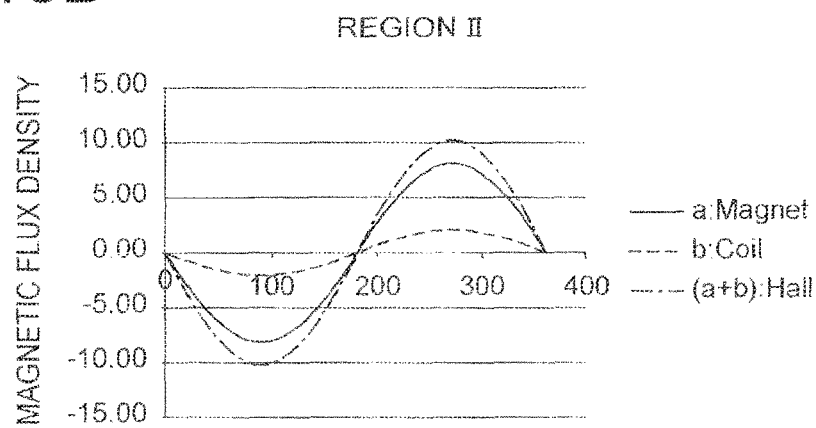
Figure 16C:
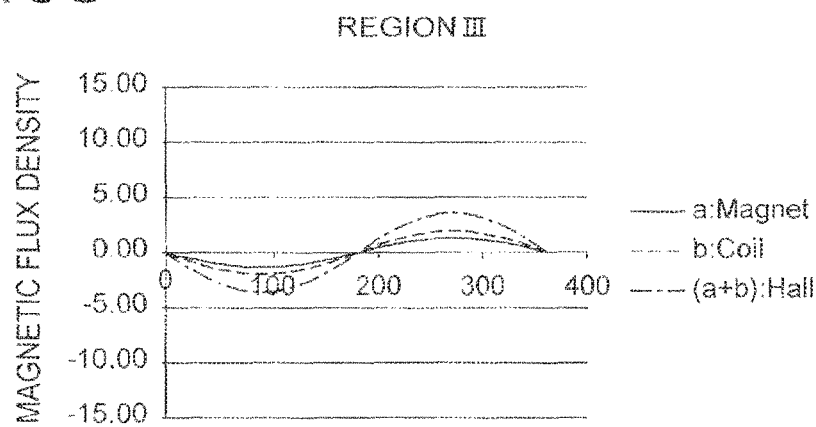

FIGS. 16A, 16B, and 16C are views showing relationships between phases and magnitudes among the magnetic flux density a of the magnetic field B generated by the front-side permanent magnetic piece 282f, the magnetic flux density b of the magnetic field $B_{11}$ generated by the first IS current $I_{IS1}$ flowing through the front-side image stabilizer coil 18f, and the total magnetic flux density (a+b) detected by the front-side Hall element 50f in the region I, the region II, and the region III of FIG. 15, respectively. FIG. 17 is a view tabulated for the relationships of FIGS. 16A-16C;

It is understood from FIGS. 16A-16C and 17 as follows.

In the band not higher than the primary resonance frequency of the region I, a magnitude |a| of the magnetic flux density a of the magnetic field B is larger than a magnitude |b| of the magnetic flux density b of the magnetic field $B_{11}$ (|a|>|b|), and the magnetic flux density a of the magnetic field B and the total magnetic flux density (a+b) are in phase although the magnetic flux density a of the magnetic field B and the magnetic flux density b of the magnetic field $B_{11}$ are opposite phase. Accordingly, in the region I, it is possible to detect the position of the auto-focusing lens holder driving portion (the AF unit) 20 by means of the front-side Hall element 50f.

On the other hand, in a band not lower than primary resonance frequency, the magnetic flux density a of the magnetic field B and the magnetic flux density b of the magnetic field $B_{11}$ are in phase because movement of the front-phase permanent magnet piece 282f is in phase with the first IS current $I_{IS1}$ flowing through the front-side image stabilizer coil portion 18f.

In the band not lower than the primary resonance frequency of the region II, the magnetic flux density a of the magnetic field B and the total magnetic flux density (a+b) are in phase because the magnitude |a| of the magnetic flux density a of the magnetic field B is larger than a magnitude |b| of the magnetic flux density b of the magnetic field $B_{11}$ (|a|>|b|). Accordingly, in the region II, it is possible to detect the position of the auto-focusing lens holder driving portion (the AF unit) 20 by means of the front-side Hall element 50f.

On the other hand, in the band not lower than the primary resonance frequency of the region III, it is understood that the magnitude |a| of the magnetic flux density a of the magnetic field B is smaller than a magnitude |b| of the magnetic flux density b of the magnetic field $B_{11}$ (|a|<|b|). However, inasmuch as the magnetic flux density b of the magnetic field B and the magnetic flux density b of the magnetic field $B_{11}$ are in phase, the magnetic flux density a of the magnetic field B and the total magnetic flux density (a+b) are also in phase. As a result, in also the region III, it is possible to detect the position of the auto-focusing lens holder driving portion (the AF unit) 20 by means of the front-side Hall element 50f. That is, resonance does not occur in an output of Hall element.

Accordingly, when the Hall element is disposed between the two loop parts of the coil, it is understood that it is possible to detect the position of the auto-focusing lens holder driving portion (the AF unit) 20 in all of frequency ranges. In other words, the Hall elements 50f and 50l can avoid to subject to adverse effect caused by the magnetic fields generated by the currents flowing through the image stabilizer coil portions 18f and 18l, respectively.

Figure 18:
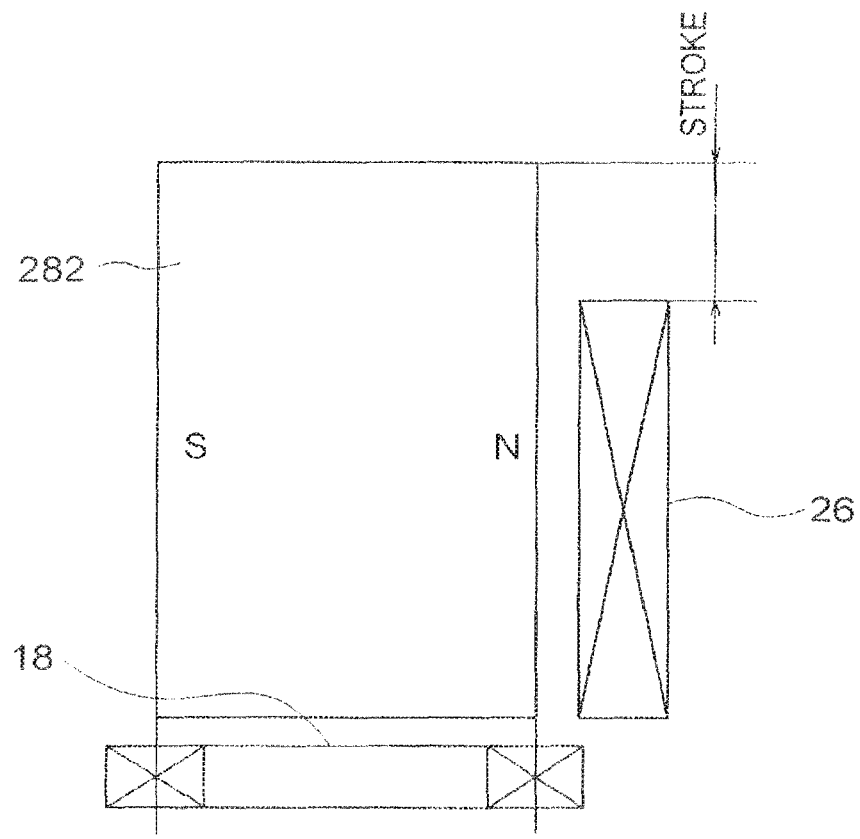
FIG. 18 is a cross sectional view showing a relationship of a placement among one permanent magnet piece of the permanent magnet, a focusing coil disposed around it, and an image stabilizer coil portion in the magnetic circuit illustrated in FIG. 11.

FIG. 18 is a cross sectional view showing a relationship of a placement among one permanent magnet piece 282 of the permanent magnet 28, the focusing coil 26 disposed around it, and the image stabilizer coil portion 18 in the magnetic circuit illustrated in FIG. 11.

It is understood that a height of the permanent magnet piece 281 is higher than a height of the focusing coil 26. It is therefore possible to make a stoke larger in a case of position adjusting the lens holder 24 (the lens barrel) in the direction of the optical axis O.

In addition, the permanent magnet piece 282 and the image stabilizer coil portion 18 are disposed so that edges of the permanent magnet piece 282 in the radial direction are laid in a coil sectional width of the image stabilizer coil portion 18 in the radial direction. It is therefore possible to heighten sensitivity of a driving force for moving the auto-focusing lens holder driving portion (the AF unit) 20 as a whole in a direction orthogonal to the optical axis O.

Incidentally, there is in danger that the four suspension wires 16 may be fracture in the lens holder driving device 10 having such a structure because the four suspension wires 16 are subjected to force in a direction to expand caused by a drop impact or the like. On this account, the lens holder driving device 10 according to this exemplary embodiment comprises a fracture preventing member for preventing the four suspension wires 16 from fracturing in the manner which will be presently described.

Figure 19:
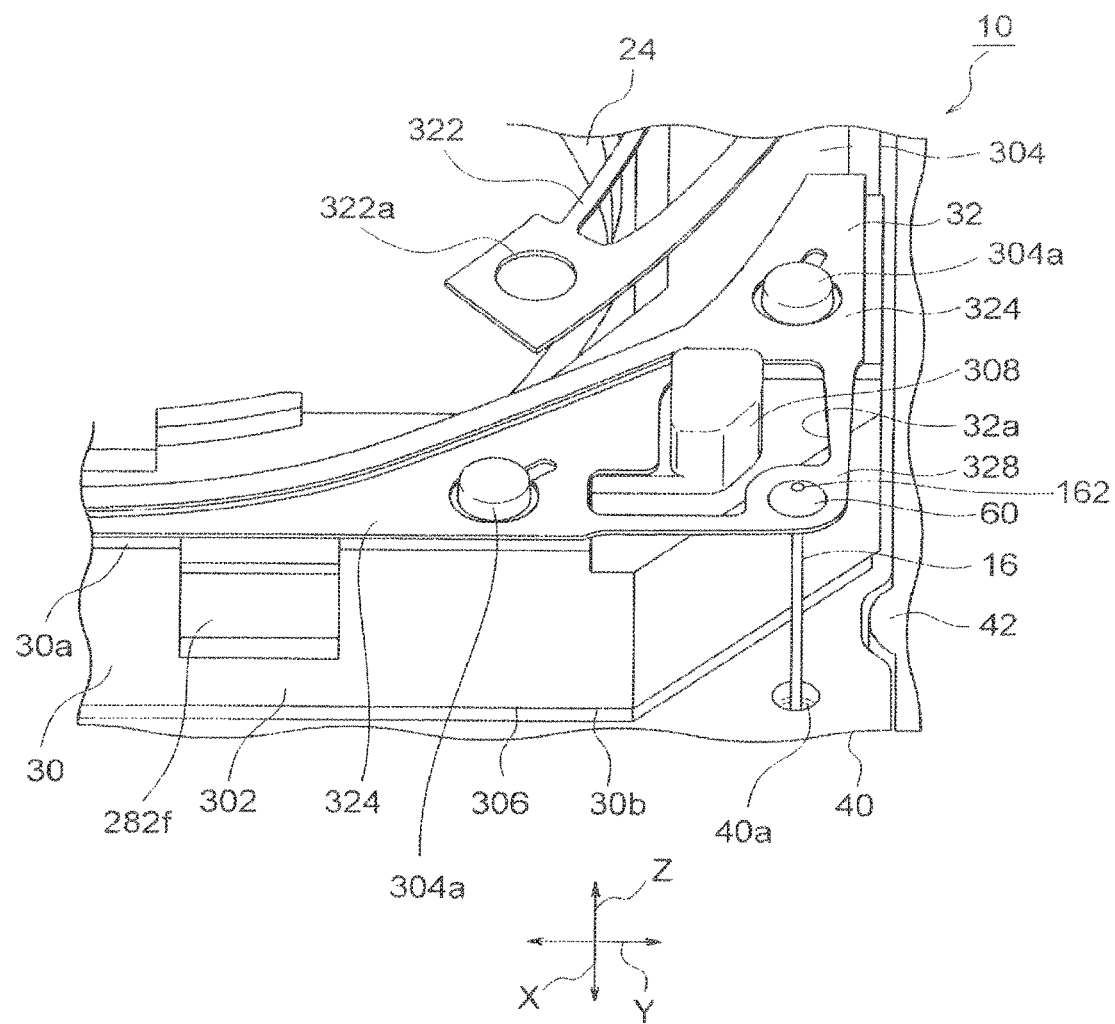
FIG. 19 is a partial perspective view enlargedly showing a part fixing a second end portion of a suspension wire to an upper leaf spring for use in the lens holder driving device illustrated in FIG. 1.
Figure 20:
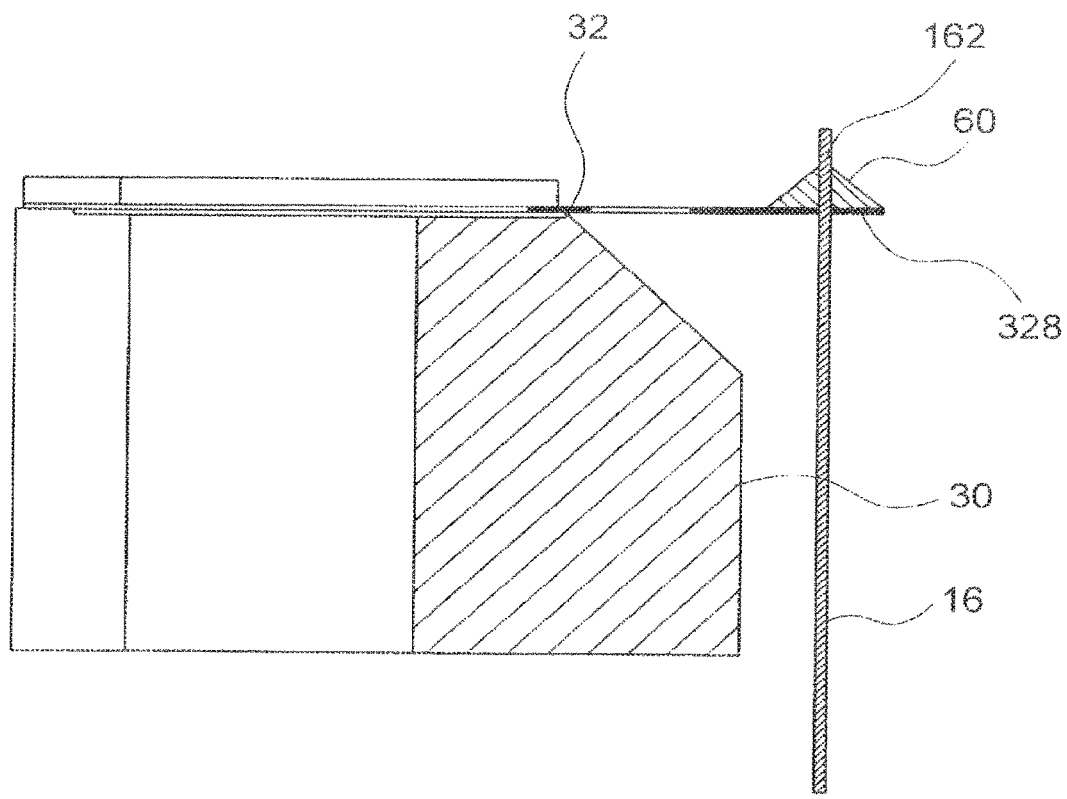
FIG. 20 is a partial cross sectional view of the fixed part illustrated in FIG. 19.

Referring to FIGS. 19 and 20, the description will proceed to the fracture preventing member according to this exemplary embodiment in detail. FIG. 19 is a partial perspective view enlargedly showing a part fixing the second end portion 162 of the suspension wire 16 to the upper leaf spring 32, FIG. 20 is a partial cross sectional view of the fixed part.

In the manner which is described above, the upper leaf spring 32 comprises the four arc-shaped extending portions 328 (only one arc-shaped extending portion 328 is shown in FIG. 19) for extending at the four corners of the upper outer end portion 324 in the radial direction outwards. The four arc-shaped extending portions 328 have, at tip portions thereof, four wire fixing holes 328a (see, FIG. 3) in which the second end portions 162 of the four suspension wires 16 are inserted (fitted), respectively. The second end portions 162 of the four suspension wires 16 are inserted in the four wire fixing holes 328a to be fixed to the four arc-shaped extending portions 328 by means of solder 60 or adhesive agent (not shown).

Accordingly, the four arc-shaped extending portions 328 serve as a wire fixing portion for fixing the second end portions 162 of the four suspension wires 16.

In the lens holder driving device 10 having such a structure, although the auto-focusing lens holder driving portion (the AF unit) 20 is subjected to the force in the direction to apart from the base 14 (the fixed portion 13) due to a drop impact or the like, the auto-focusing lens holder driving portion (the AF unit) 20 moves upward with the four arc-shaped extending portions 328 elastically deformed in a state where the second end portions 162 of the four suspension wire 16 are fixed to the four arc-shaped extending portions 328.

As a result, it is possible to prevent the four suspension wires 16 from fracturing. Accordingly, the four arc-shaped extending portions 328 acts as the fracture preventing member for preventing the four suspension wires 16 from fracturing.

On the other hand, as shown in FIG. 19, the magnet holder 30 comprises four upper stoppers 308 (only one upper stopper 308 is shown in FIG. 19) which project at the four corners of the upper ring-shaped end portion 304 upwards. Each upper stopper 308 projects from an opening 32a formed in the upper leaf spring 32 between the upper outer end portion 324 and the each arc-shaped extending portion 328.

In other words, the four upper stoppers 308 project from the magnet holder 30 toward an inner wall surface of the shielding cover 42.

By the four upper stoppers 308, movement of the auto-focusing lens holder driving portion (the AF unit) 20 upwards is limited. In other words, when auto-focusing lens holder driving portion (the AF unit) 20 moves upwards, the four upper stoppers 308 of the magnet holder 30 hits to the inner wall surface of the upper end portion 424 of the shielding cover 42 although the four arc-shaped extending portions 328 become elastically deformed before the four arc-shaped extending portions 328 buckle or before the four suspension wires 16 are subjected to a fracturing force.

That is, the four upper stoppers 308 serve as a fracture prevention supporting member for supporting prevention of fracture in the four suspension wires 16.

As shown in FIG. 2, there is little clearance (gap) between the fixed portion 13 (the coil board 40) and the auto-focusing lens holder driving portion (the AF unit) 20. Accordingly, although the auto-focusing lens holder driving portion (the AF unit) 20 is subjected to a force in a direction to get near the fixed portion 13 (the coil board 40) due to a drop impact or the like, the four suspension wires 16 do not buckle because the auto-focusing lens holder driving portion (the AF unit) 20 immediately hits to an upper surface of the fixed portion 13 (the coil board 40).

Figure 21:
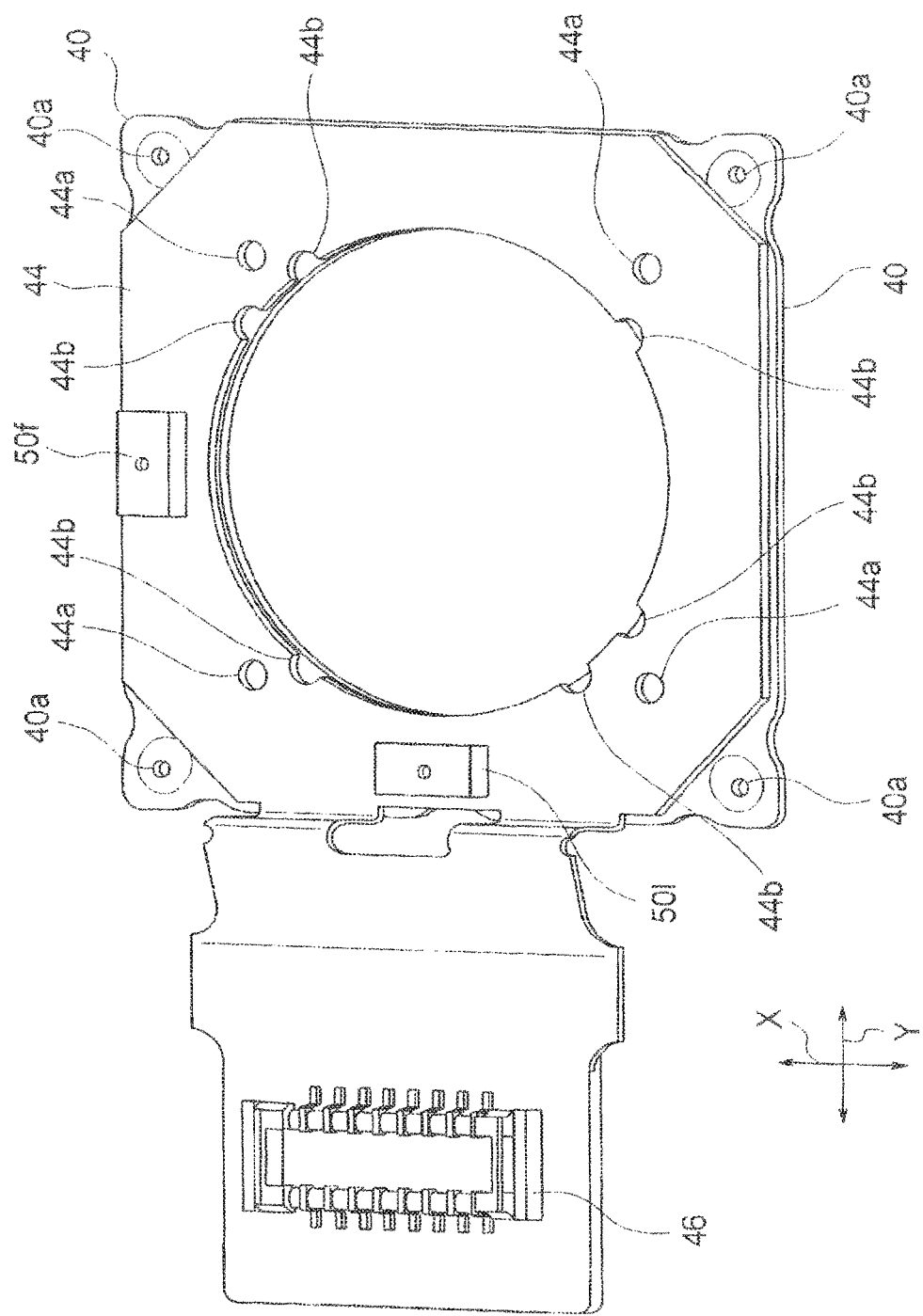
FIG. 21 is a perspective view showing a assembly of a coil board and a flexible printed circuit (FPC) for use in the lens holder driving device illustrated in FIG. 1 seen from a rear side.

Referring to FIG. 21 in addition to FIGS. 2 to 4, the description will proceed to the flexible printed circuit (FPC) 44 disposed between the base 41 and the coil board 40 and a method of mounting it. FIG. 21 is a perspective view showing an assembly of the coil board 40 and the flexible printed circuit (FPC) 44 seen from a rear side;

As shown in FIG. 3, the base 14 has four positioning protrusions 142 which project upwards on diagonal lines in vicinity of the circular opening 14a in the radial direction outwards. On the other hand, as shown in FIG. 4, the coil board 40 has four positioning hole portions 40b in which the four positioning protrusions 142 are charged, respectively. As shown in FIG. 21, the flexible printed circuit (FPC) 44 also has four positioning hole portions 44a at positions corresponding to the four positioning hole portions 40b. Accordingly, the four positioning protrusions 142 of the base 14 are charged in the four positioning hole portions 40b of the coil board 40 via the four positioning hole portions 44a of the flexible printed circuit (FPC) 44.

As shown in FIG. 21, the flexible printed circuit (FPC) 44 has a rear surface on which the two Hall elements 50f and 50l are mounted. On the other hand, as shown in FIG. 2, the base 14 has concave portions 14b in which the two Hall elements 50f and 50l are fitted.

As shown in FIG. 4, on the coil board 40, six lands 18a for supplying electric currents to the four image stabilizer coil portions 18f, 18b, 18l, and 18r are formed along the circular opening 40a bored at a central portion thereof. On the other hand, as shown in FIG. 21, on the flexible printed circuit (FPC) 44, six notch portions 44b are formed at positions corresponding to the six lands 18a. Accordingly, by mounting solder pastes on the six notch portions 44b and by carrying out solder reflow, it is possible to electrically connect internal wiring (not shown) of the flexible printed circuit (FPC) 44 with the six lands 18a of the coil board 44.

In the manner which is described above, the first end portions 161 of the four suspension wires 16 pass through the four through holes 40a of the coil board 40 and are fixed to the coil board 40.

As shown in FIG. 4, on the coil board 40, four lands are formed around the four through holes 40a, respectively. Among the four lands formed around the through holes 40a, two lands (right-back and left-front in the example of FIG. 4) are electrically connected to the inner wiring (not shown) of the flexible printed circuit (FPC) 44 by means of solder. Accordingly, among the four suspension wires 16, the first end portions 161 of the two suspension wires 16 are fixed to the coil board 40 at the above-mentioned two lands by means of the above-mentioned solder and are electrically connected to the flexible printed circuit (FPC) 44. On the other hand, the first end portions 161 of remaining two suspension wires 16 are fixed to the coil board 40 at remaining two lands by means of solder or adhesive agent but are electrically insulated to the internal wiring (not shown) of the flexible printed circuit (FPC) 44.

As shown in FIG. 21, the flexible printed circuit (FPC) 44 has a rear surface on which a control portion 46 is mounted. The control portion 46 controls the AF current flowing through the focusing coil 16 and controls the first through fourth IS currents flowing through the four image stabilizer coil portions 18f, 18b, 18l, and 18r so as to compensate wobbling detected based on two directional gyro sensors (not shown) on the basis of position detected signals detected by the two Hall elements 50f and 50l.

Figure 22:
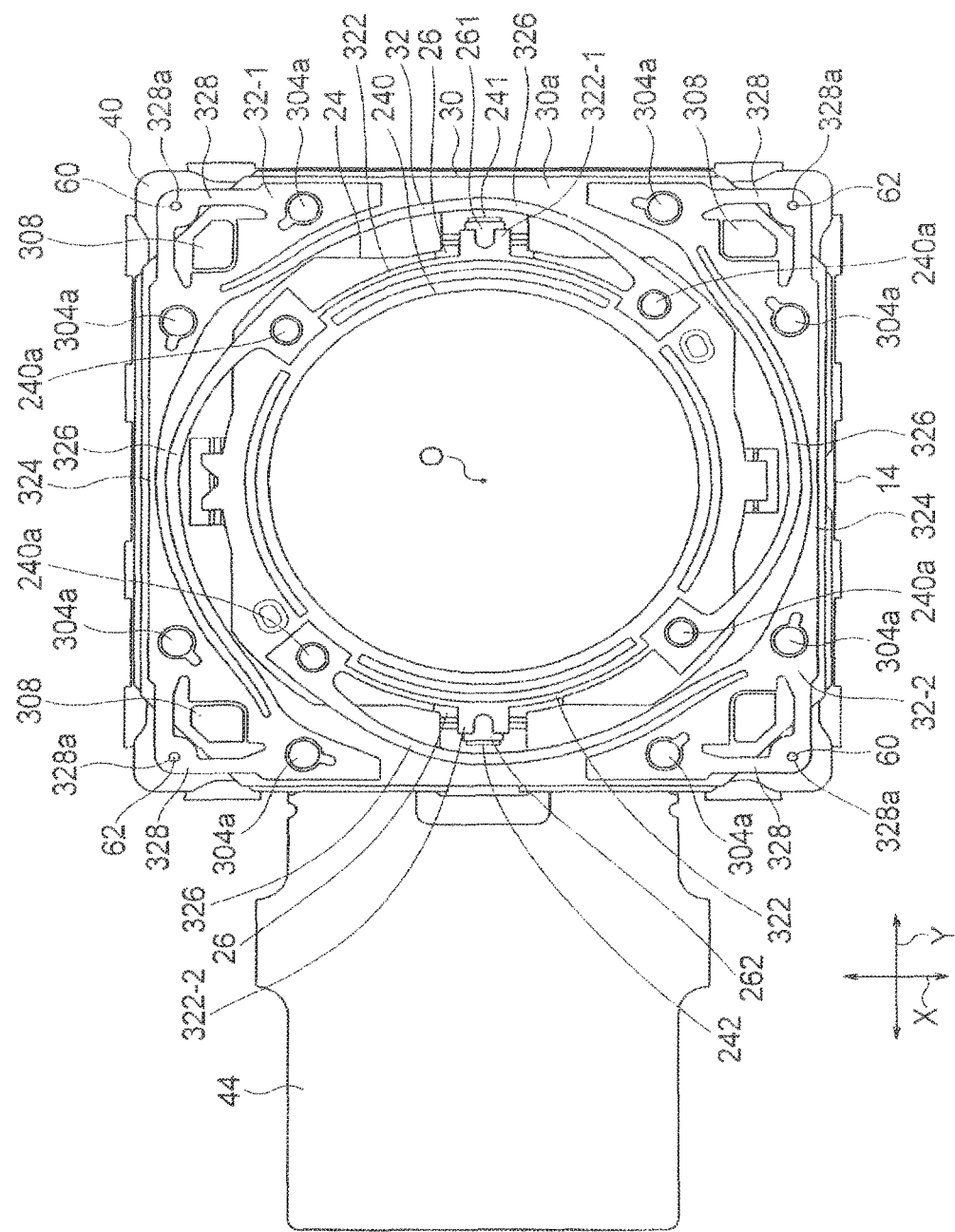
FIG. 22 is a plan view showing a state where a shielding cover is omitted from the lens holder driving device illustrated in FIG. 1.
Figure 23:
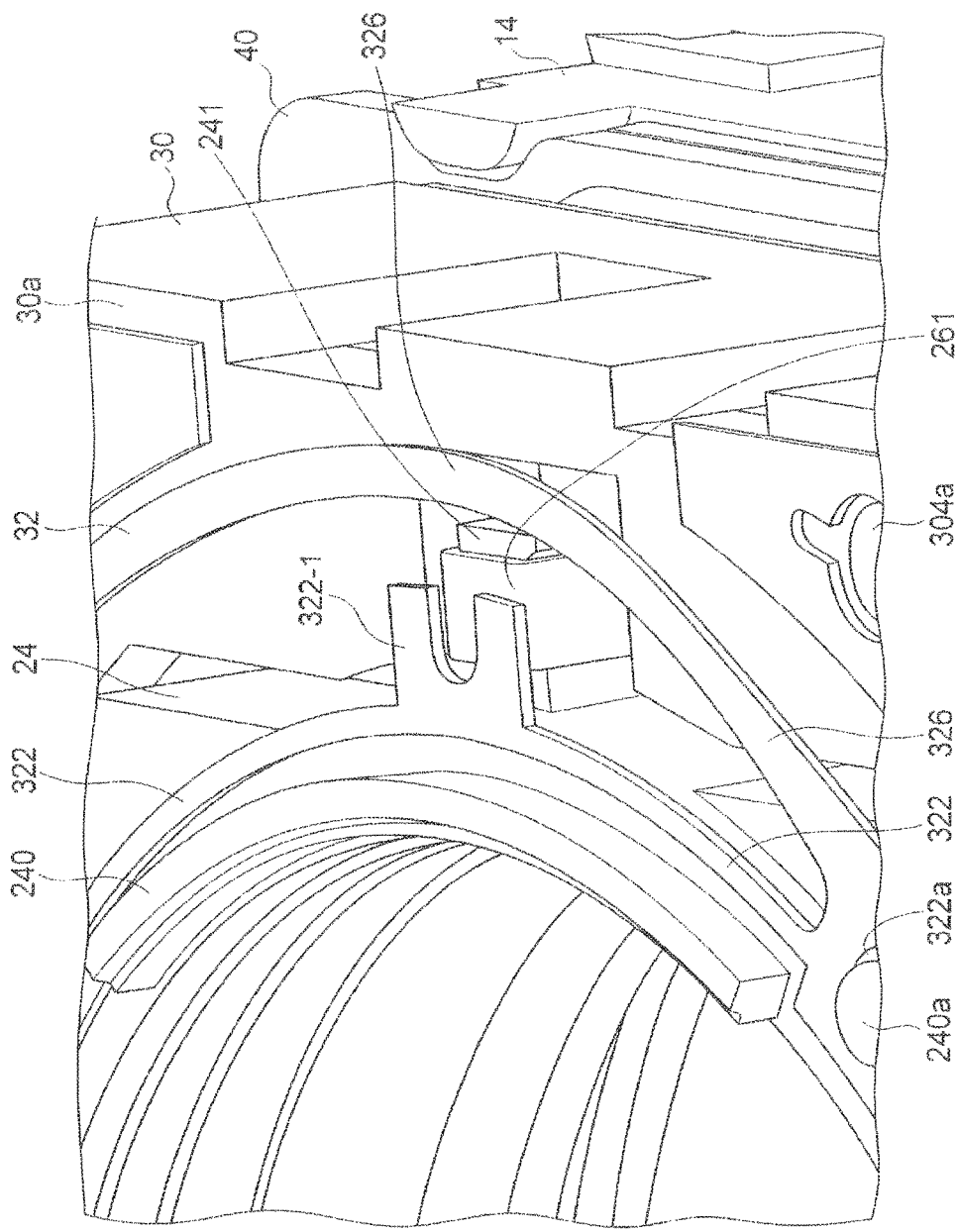
FIG. 23 is a partial enlarged perspective view enlargedly showing a tied-up part of an end portion of a wire composed of the focusing coil in FIG. 22.

Referring to FIGS. 22 and 23, the description will proceed to a method for feeding to the focusing coil 26. FIG. 22 is a plan view showing a state where the shielding cover 42 is omitted from the lens holder driving device 10. FIG. 23 is a partial enlarged perspective view enlargedly showing a tied-up part of an end portion of a wire composed of the focusing coil 26.

As shown in FIG. 22, lens holder 24 has, at an upper end thereof, first and second projecting portions 241 and 242 which project in a direction (outwards in the radial direction) to apart from each other in the left-and-right direction Y. In the example being illustrated, the first projecting portion 241 is also called a right-side projecting portion because it projects to right side while the second projecting portion 242 is also called a left-side projecting portion because it projects to left side.

On the other hand, the wire composed of the focusing coil 26 has first and second end portions 261 and 262. As shown in FIG. 23, the first end portion 261 of the wire of the focusing coil 26 is tied up to the first projecting portion (the right-side projecting portion) 241 of the lens holder 24. Similarly, the second end portion 262 of the wire of the focusing coil 26 is tied up to the second projecting portion (the left-side projecting portion) 242 of the lens holder 24. Accordingly, the first and second end portions 261 and 262 are also called first and second tied-up parts, respectively.

On the other hand, as shown in FIG. 22, the first leaf spring (the upper leaf spring) 32 comprises first and second leaf spring pieces 32-1 and 32-2 which are electrically insulated from each other. The first and second leaf spring pieces 32-1 and 32-2 have rotational symmetry shapes with respect to the optical axis O of the lens as a center. The first leaf spring piece 32-1 is disposed, at the first end (the upper end) of the magnet holder 30, substantially back side and right side while the second leaf spring piece 32-2 is disposed, at the first end (the upper end) of the magnet holder 30, substantially front side and left side.

The upper inner end portion 322 of the first leaf spring piece 32-1 disposed at the right side has a first U-shaped terminal portion 322-1 projecting rightwards (outwards in the radial direction) at a position corresponding to the first projecting portion (the right-side projecting portion) 241 of the lens holder 24. Likewise, the upper inner end portion 322 of the second leaf spring piece 32-2 disposed at the left-side has a second U-shaped terminal portion 322-2 projecting leftwards (outwards in the radial direction) at a position corresponding to the second projecting portion (the left-side projecting portion) 242 of the lens holder 24. The first U-shaped terminal portion 322-1 is also called a right-side U-shaped terminal portion while the second U-shaped terminal portion 322-2 is also called a left-side U-shaped terminal portion.

The first U-shaped terminal portion (the right-side U-shaped terminal portion) 322-1 is electrically connected to the first end portion (the first tied-up part) 261 of the focusing coil 26 by means of solder (not shown) at the first projecting portion (the right-side projecting portion) 241 of the lens holder 24. Similarly, the second U-shaped terminal portion (the left-side U-shaped terminal portion) 322-2 is electrically connected to the second end portion (the second tied-up part) 262 of the focusing coil 26 by means of solder (not shown) at the second projecting portion (the left-side projecting portion) 242 of the lens holder 24.

In addition, in the manner which is described above, among the four suspension wires 16, the second end portions 162 of the two suspension wires 16 (right-back and left-front in the example of FIG. 22) are connected to the arc-shaped extending portions 328 through the wire fixing holes 328a by means of solder 60. The second end portions 162 of remaining two suspension wires 16 (left-back and right-front in the example of FIG. 22) are fixed to the arc-shaped extending portions 328 through the wire fixing holes 328a by means of adhesive agent 62. Solder may be used in lieu of the adhesive agent 62.

Furthermore, in the manner which is described above, among the four suspension wires 16, the first end portions 161 of the two suspension wires 16 (right-back and left-front in the example of FIG. 22) are fixed to the lands of the coil board 44 via the through holes 40a by means of solder and are electrically connected to the flexible printed circuit (FPC) 44. The first end portions 161 of the remaining two suspension wires 16 (left-back and right-front in the example of FIG. 22) are connected to the lands of the coil board 40 via the through holes 40a by means of solder or adhesive agent but are electrically insulated from the flexible printed circuit (FPC) 44.

Accordingly, the flexible printed circuit (FPC) 44 is electrically connected to the first end portion (the first tied-up part) 261 of the focusing coil 26 via the suspension wire 16 of the right-back, the first leaf spring piece 32-1 of the first leaf spring (the upper leaf spring) 32, and the first U-shaped terminal portion (the right-side U-shaped terminal portion) 322-1. Similarly, the flexible printed circuit (FPC) 44 is electrically connected to the second end portion (the second tied-up part) 262 of the focusing coil 26 via the suspension wire 16 of the left-front, the second leaf spring piece 32-2 of the first leaf spring (the upper leaf spring) 32, and the second U-shaped terminal portion (the left-side U-shaped terminal portion) 322-2.

In the manner which is described above, feeding to the focusing coil 26 is carried out from the flexible printed circuit (FPC) 44 via the two suspension wires 16 and the first leaf spring 32.

New, the description will proceed to a method of assembling the lens holder driving device 10.

First, the auto-focusing lens holder driving portion (the AF unit) 20 is manufactured by assembling the lens holder 24, the focusing coil 26, the permanent magnet 28, the magnet holder 30, the upper leaf spring 32, the lower leaf spring 34, and the spacer 36.

On the other hand, an assembly consisting of the coil board 40 and the flexible printed circuit (FPC) 44, as shown in FIG. 21, is manufactured by the above-mentioned solder reflow. The assembly is mounted on the base 14 provided the side of the first terminal portions 161 of the four suspension wires 16.

Subsequently, the above-mentioned auto-focusing lens holder driving portion (the AF unit) 20 is mounted on the base 14 via the above-mentioned assembly and the second end portions 162 of the four suspension wires 14 are fixed to the arc-shaped extending portions 328 via the wire fixing holes 328a by means of the solder 60 or the adhesive agent 62.

The first and second U-shaped terminal portions 322-1 and 322-2 of the first leaf spring (the upper leaf spring) 32 are connected to the first and second end portions 261 and 261 of the focusing coil 26.

Lastly, the shielding cover 42 is put so as to cover the auto-focusing lens holder driving portion (the AF unit) 20 and a lower end of the shielding cover 42 is fixed to the base 14.

As such a manner, it is possible to easily assemble the lens holder driving device 10.

The lens holder driving device 10 assembled in such a manner has a size of 11 mm.times.11 mm.times.4.2 mm.

The above-mentioned lens holder driving device 10 according to the first exemplary embodiment of the present invention has effects which will be presently described.

First, it is possible for the two Hall elements 50f and 50l to avoid a detrimental effect caused by the magnetic field generated by the current flowing through the specific two image stabilizer coil portions 18f and 18l because the two Hall elements 50f and 50l are disposed on the base 14 at the positions where the specific two image stabilizer coil portions 18f and 18l are separated into the respective two coil parts 18fl, 18fr and 18lf, 18lb.

Secondly, it is possible to prevent the four suspension wires 15 from fracturing and to heighten impact resistance of the lens holder driving device 10 because the lens holder driving device comprises the fracture preventing member 328.

Thirdly, it is possible to electrically connect the inner wiring of the flexible printed circuit (FPC) 44 with the plurality of lands 18a of the coil board 40 by means of solder reflow because the notch portions 44b are formed to the flexible printed circuit (FPC) 44 at the positions corresponding to the plurality of lands 18a formed on the coil board 40.

Fourthly, it is possible to make the stoke in the case of position adjusting the lens holder 24 (the lens barrel) in the direction of the optical axis O larger because the height of the focusing coil 26 is lower than the height of the permanent magnet piece 282.

Fifthly, it is possible to enhance sensitivity of the driving force for moving the auto-focusing lens holder driving portion (the AF unit) 20 as a whole in the direction orthogonal to the optical axis O because the permanent magnet pieces 282 and the image stabilizer coil portions 18 are disposed so that the edges of the permanent magnet pieces in the radial direction are laid in the coil sectional width of the image stabilizer coil portions 18 in the radial direction.

Figure 24:
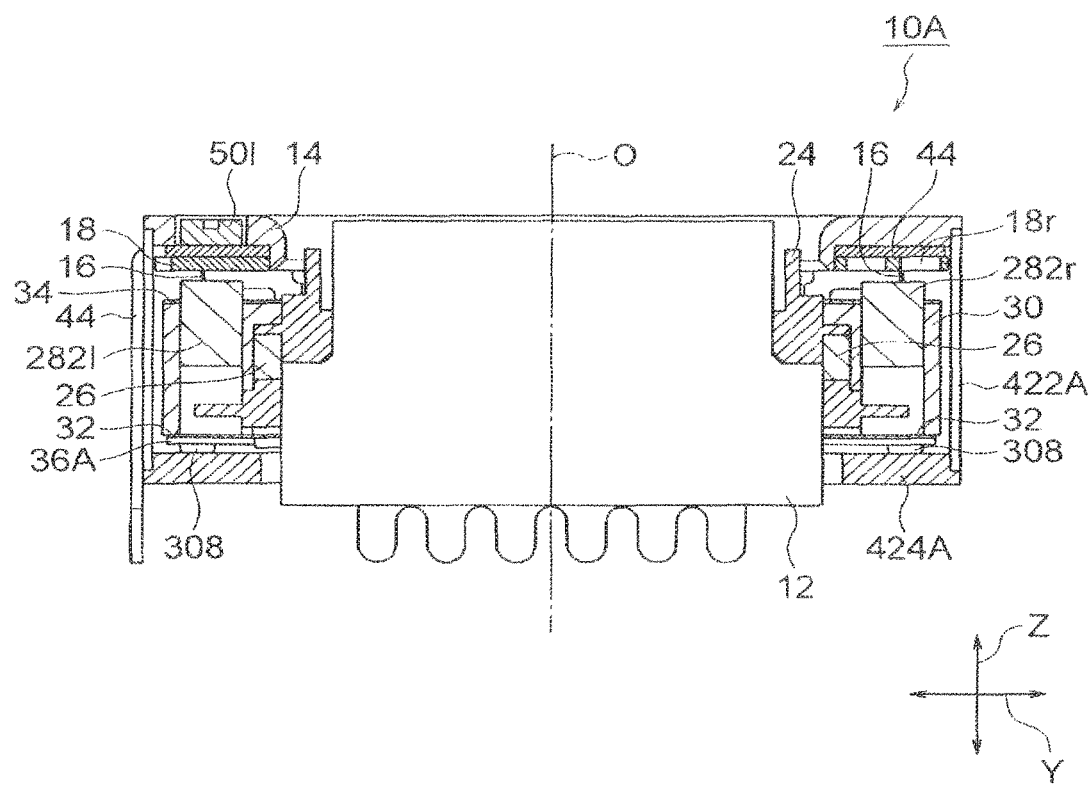
FIG. 24 is a vertical cross sectional view of a lens holder driving device according to a second exemplary embodiment of the present invention.
Figure 25:
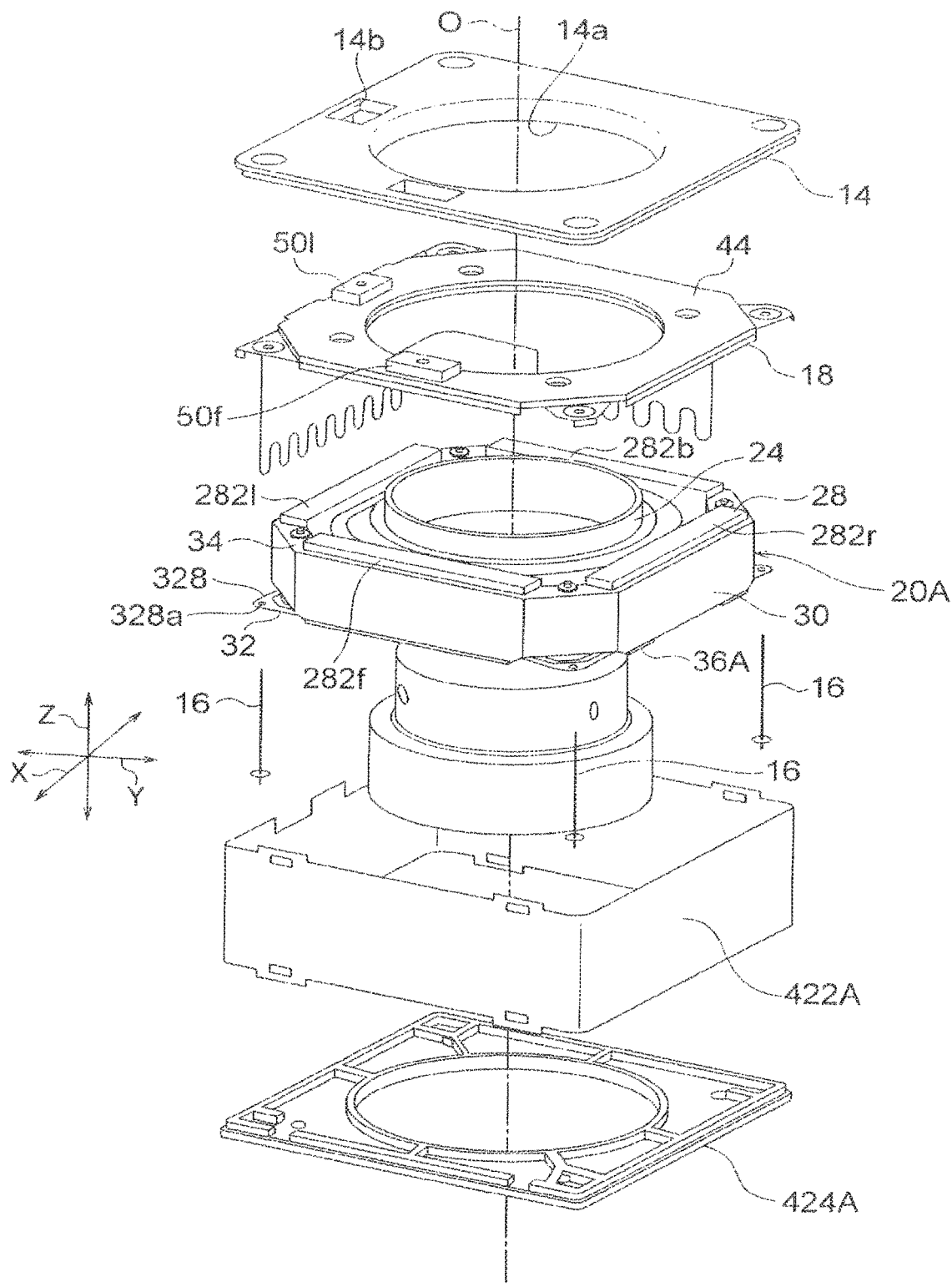
FIG. 25 is an exploded perspective view of the lens holder driving device illustrated in FIG. 24.

Referring to FIGS. 24 and 25, the description will proceed to a lens holder driving device 10A according to a second exemplary embodiment of the present invention. FIG. 24 is a vertical cross sectional view of the lens holder driving device 10A. FIG. 25 is an exploded perspective view of the lens holder driving device 10A.

Herein, in the manner shown in FIGS. 24 and 25, an orthogonal coordinate system (X, Y, Z) is used. In a state illustrated in FIGS. 24 and 25, in the orthogonal coordinate system (X, Y, X), an X-axis direction is a fore-and-aft direction (a depth direction), a Y-axis direction is a left-and-right direction (a width direction), and a Z-axis direction is an up-and-down direction (a height direction). In addition, in the example being illustrated in FIGS. 24 and 25, the up-and-down direction Z is a direction of an optical axis O of a lens. In the second exemplary embodiment, the X-axis direction (the fore-and-aft direction) is called a first direction while the Y-axis direction (the left-and-right direction) is called in a second direction.

However, in an actual use situation, the direction of the optical axis O, namely, the Z-axis direction becomes a fore-and-aft direction. In other words, an upper direction of the Z-axis becomes a front direction while a lower direction of the Z-axis becomes a rear direction.

The illustrated lens holder driving device 10A includes an auto-focusing lens holder driving portion 20A and an image stabilizer portion for stabilizing blurry images produced in the auto-focusing lens holder driving portion 20A on picking up a static image using a miniature camera for a mobile terminal and is a device which can pick up the image free from image blurred.

The illustrated lens holder driving device 10A has a structure in which the lens holder driving device 10 according to the above-mentioned first exemplary embodiment is substantially turned upside down. Accordingly, it is suitable to change "upper" into "lower" and to change "lower" into "upper". In order to simplify the description, the same reference signs are attached to those having functions similar those of the lens holder driving device 10 according to the first exemplary embodiment and the description will later be made as regards only differences.

A lend barrel 12 has a shape like a hanging bell. In place of the shielding cover 42, a shielding wall 422A having a rectangular tubular shape and a second base (a cover) 424A are used. In the auto-focusing lens holder driving portion (an AF unit) 20A, a spacer 36A is mounted to the lower leaf spring 32 serving as a first leaf spring.

A configuration except for those is similar to the above-mentioned lens holder driving device 10 according to the first exemplary embodiment.

Accordingly, the lens holder driving device 10A according to the second exemplary embodiment of the present invention has effects similar to those of the above-mentioned lens holder driving device 10 according to the first exemplary embodiment.

While this invention has been particularly shown and described with reference to the exemplary embodiments thereof, the invention is not limited to the embodiment. It will be understood by those of ordinary skill in the art that various changes in form and details may be therein without departing from the spirit and scope of the present invention as defined by the claims.

For example, although the plurality of suspension wires having the first end portions fixed to the periphery of the fixed portion are used as the supporting member for swingably supporting the auto-focusing lens holder driving portion with respect to the fixed portion, the supporting member is not limited to those.

The whole or part of the exemplary embodiments disclosed above can be described as, but not limited to, the following supplementary notes.

(Supplementary Note 1)

A lens holder driving device (10; 10A) comprising:

an auto-focusing lens holder driving portion (20; 20A) moving a lens holder (24) holding a lens barrel (12) along an optical axis (O); and an image stabilizer portion stabilizing image blurred by moving said auto-focusing lens holder driving portion (20; 20A) in first and second directions (X, Y) which are orthogonal to the optical axis (O) and which are perpendicular to each other, wherein said auto-focusing lens holder driving portion (20; 20A) comprises:

a focusing coil (26) fixed to said lens holder (24);

a permanent magnet (28) comprising a plurality of permanent magnet pieces (282f, 282b, 282l, 282r) which have first surfaces opposed to said focusing coil (26) and which are disposed outsides of said focusing coil (26) with respect to the optical axis (O) in a radial direction so as to oppose to each other in the first direction (X) and the second direction (Y);

a magnet holder (30), disposed around the periphery of said lens holder (24), holding said permanent magnet (28), said magnet holder (30) having first and second ends (30a, 30b) opposite to each other in a direction of the optical axis (O); and first and second leaf springs (32, 34), mounted to the first and the second ends (30a, 30b) of said magnet holder (30), supporting said lens holder (24) in the direction of the optical axis (O) shiftably so as to position said lens holder (24) in the radial direction, wherein said image stabilizer portion comprises:

a fixed portion (13) disposed apart from said auto-focusing lens holder driving portion (20; 20A) in the direction of the optical axis (O) at a position in the vicinity of said second leaf spring (34);

a supporting member (16) swingably supporting said auto-focusing lens holder driving portion (20; 20A) in the first direction (X) and the second direction (Y) with respect to said fixed portion (13);

an image stabilizer coil (18) comprising a plurality of image stabilizer coil portions (18f, 18b, 18l, 18r) mounted on said fixed portion (13) so as to oppose to second surfaces of said plurality of plurality of permanent magnet pieces (282f, 282b, 282l, 282r) that are perpendicular of to the first surfaces, said image stabilizer coil (18) comprising specific image stabilizer coil portions (18f, 18l), among said plurality of hand blurring correction coil portions, disposed in the first direction (X) and the second direction (Y), each of said specific image stabilizer coil portions (18f, 18l) being divided into a plurality of coil parts (18fl, 18fr; 18lf, 18lb) so as to separate in a longitudinal direction of said permanent magnet piece (282f, 282l) opposed thereto; and a plurality of Hall elements (50f, 50l) disposed on said fixed portion (13) at positions where each of said specific image stabilizer coil portions (18f, 18l) are separated into said plurality of coil portions (18fl, 18fr; 18lf, 18lb).

(Supplementary Note 2)

The lens holder driving device according to Supplementary note 1, wherein said permanent magnet (28) comprises four permanent magnet pieces (282f, 282b, 282l, 282r), wherein said image stabilizer coil (18) comprises four image stabilizer coil portions (18f, 18b, 18l, 18r) including two specific image stabilizer coil portions (18f, 18l) disposed in the first direction (X) and the second direction (Y), each of said two specific image stabilizer coil portions (18f, 18l) being divided into two coil ports (18fl, 18fr; 18lf, 18lb) so as to separate at a center in the longitudinal direction of the permanent magnet piece (282f, 282l) opposed thereto, wherein said plurality of Hall elements comprise two Hall elements (50f, 50l), said two Hall elements (50f, 50l) being disposed on said fixed portion (13) at the positions where each of said two specific image stabilizer coil portions (18f, 18l) are separated into said two coil parts (18fl, 18fr; 18lf, 18lb).

(Supplementary Note 3)

The lens holder driving device according to Supplementary note 1, wherein said supporting member comprises a plurality of suspension wires (16) having first end portions (161) fixed to said fixed portion (13) at outer regions thereof, said plurality of suspension wires (16) extending along the optical axis (O) and swingably supporting said auto-focusing lens holder driving portion (20; 20A) in the first direction (X) and the second direction (Y).

(Supplementary Note 4)

The lens holder driving device according to Supplementary note 3, wherein the plurality of suspension wires (16) have second end portions (162) fixed to said first leaf spring (32).

(Supplementary Note 5)

The lens holder driving device according to Supplementary note 4, wherein said lens holder (24) comprises a tubular portion (240) holding said lens barrel (12) and protrusion portions (241, 242) projecting from an outer wall of said tubular portion (240), wherein said focusing coil (26) is made of a wire having end portions (261, 262) which are tied up to said protrusion portions, wherein said first leaf spring (32) has terminal portions (322-1, 322-2) projecting therefrom so as to be disposed in the vicinity of said protrusion portions, wherein said terminal portions (322-1, 322-2) and the end portions (261, 262) of said wire tied up to said protrusion portions (241, 242) are electrically connected, whereby feeding from said suspension wires (16) to said focusing coil (26) through said first leaf spring (32).

In this connection, inasmuch as reference symbols in parentheses are attached in order to facilitate an understanding of this invention and are merely one example thereof, this invention is, of course, not limited to them.

What is claimed is:
1. A lens driving device comprising:
an assembly that is formed by assembling a lens holder together with a permanent magnet disposed around said lens holder; and
an image stabilizer portion configured to stabilize a blurred image by moving said assembly in first and second directions which are orthogonal to an optical axis of said lens holder and which are perpendicular to each other, wherein said permanent magnet comprises a plurality of permanent magnet pieces which are disposed around said lens holder so as to oppose each other in the first direction and the second direction, said plurality of permanent magnet pieces being magnetized in a radial direction, and
wherein said image stabilizer portion comprises:
a base disposed apart from said assembly in the direction of the optical axis,
a supporting member swingably supporting said assembly in the first direction and the second direction with respect to said base,
an image stabilizer coil comprising a plurality of image stabilizer coil portions mounted on said base, each of said image stabilizer coil portions having a coil plane perpendicular to the optical axis and opposing one of said plurality of permanent magnet pieces, said image stabilizer coil comprising specific image stabilizer coil portions, among said plurality of image stabilizer coil portions, disposed in the first direction and the second direction, each of said specific image stabilizer coil portions being divided into a plurality of coil parts so as to separate in a longitudinal direction of a corresponding permanent magnet piece opposed thereto, said plurality of coil parts opposing one surface of said corresponding permanent magnet piece and each of said plurality of coil parts having a shape extending in the longitudinal direction of the corresponding permanent magnet piece opposed thereto, and a plurality of Hall elements disposed on said base at positions where each of said specific image stabilizer coil portions is separated into said plurality of coil parts, each of said plurality of Hall elements opposing said one surface of said corresponding permanent magnet piece opposed to said plurality of coil parts.

2. The lens driving device according to claim 1, wherein said permanent magnet comprises four permanent magnet pieces, said image stabilizer coil comprises four image stabilizer coil portions including two specific image stabilizer coil portions disposed in the first direction and the second direction, each of said two specific image stabilizer coil portions being divided into two coil parts so as to separate at a center in the longitudinal direction of said corresponding permanent magnet piece opposed thereto, said two coil parts opposing said one surface of said corresponding permanent magnet piece and each of said two coil parts having a shape extending in the longitudinal direction of the corresponding permanent magnet piece opposed thereto, and said plurality of Hall elements comprise two Hall elements disposed on said base at positions where each of said two specific image stabilizer coil portions is separated into said two coil parts, each of said two Hall elements opposing said one surface of said corresponding permanent magnet piece opposed to said plurality of coil parts.

3. The lens driving device according to claim 1, wherein said supporting member comprises a plurality of suspension wires having first end portions fixed to said base at outer regions thereof, said plurality of suspension wires extending along the optical axis and swingably supporting said assembly in the first direction and the second direction.

4. The lens driving device according to claim 3, wherein said plurality of suspension wires have second end portions fixed to said assembly.

* * * * *